United States Patent
Moriya et al.

(10) Patent No.: US 9,869,609 B2
(45) Date of Patent: Jan. 16, 2018

(54) VIBRATION DAMPING SYSTEM AND VEHICLE

(71) Applicant: SINFONIA TECHNOLOGY CO., LTD., Tokyo (JP)

(72) Inventors: Hideaki Moriya, Tokyo (JP); Takenori Motoori, Tokyo (JP); Tomohiro Okazaki, Tokyo (JP)

(73) Assignee: SINFONIA TECHNOLOGY CO., LTD., Tokyo (JP)

( * ) Notice: Subject to any disclaimer, the term of this patent is extended or adjusted under 35 U.S.C. 154(b) by 198 days.

(21) Appl. No.: 14/703,055

(22) Filed: May 4, 2015

(65) Prior Publication Data

US 2016/0018294 A1 Jan. 21, 2016

(30) Foreign Application Priority Data

Jul. 18, 2014 (JP) ................................. 2014-147403

(51) Int. Cl.
*G01M 17/04* (2006.01)
*B60G 17/0185* (2006.01)

(52) U.S. Cl.
CPC ......... *G01M 17/04* (2013.01); *B60G 17/0185* (2013.01); *B60G 2600/08* (2013.01)

(58) Field of Classification Search
CPC .. G01M 13/028; G01M 13/045; G01M 15/12; G01M 17/04
See application file for complete search history.

(56) References Cited

U.S. PATENT DOCUMENTS

2006/0222291 A1* 10/2006 Yoshida ............. G02B 26/0833
385/18
2012/0293094 A1* 11/2012 Moriya ................ F16F 15/002
318/135

FOREIGN PATENT DOCUMENTS

JP 2009-275814 A 11/2009

* cited by examiner

*Primary Examiner* — Erika J Villaluna
(74) *Attorney, Agent, or Firm* — Westerman, Hattori, Daniels & Adrian, LLP

(57) ABSTRACT

A vibration damping system comprises a vibration applying device mounted on a frame and a control device that controls the vibration applying device, the control device comprising a voltage command producing part that produces a driving voltage command to drive the vibration applying device and a vibration failure diagnosis part that diagnoses whether there is failure based on a vibration detection signal output by a vibration detecting device, wherein the voltage command producing part produces the driving voltage command corresponding to a diagnosis frequency that is previously set at a frequency identical to a resonance frequency of the frame or the vibration applying device or at a predetermined frequency close to the resonance frequency and makes the vibration applying device generate the vibration applying force according to the driving voltage command, and the vibration failure diagnosis part diagnoses whether there is failure based on the vibration detection signal.

11 Claims, 11 Drawing Sheets

VIBRATION DAMPING SYSTEM AND VEHICLE

CROSS-REFERENCE TO RELATED APPLICATIONS

This application claims priority of Japanese Patent Application No. 2014-147403 filed on Jul. 18, 2014. The contents of the applications are incorporated herein by reference in their entirety.

FIELD OF THE ART

This invention relates to a vibration damping system and a vehicle that can be operated in a failure diagnosis mode to diagnose whether there is failure or not in addition to an operation of damping vibration in a normal mode.

BACKGROUND ART

Conventionally, several vibration damping systems are presented. The vibration damping system is mounted on a device inside of which a vibration source is provided and damps the vibration produced by the vibration source.

For example, the patent document 1 discloses a vibration damping system wherein an actuator as being a vibration applying device is mounted on a frame of a vehicle, vibration transmitted from an engine as being a vibration source is detected, an offset vibration that offsets the vibration is generated by the above-mentioned actuator so that the vibration by the engine is damped.

This kind of the vibration damping system is generally constructed by mounting a vibration detecting device at a desired position of the frame and by reducing vibration at a position where the vibration detecting device is mounted. With this arrangement, the vibration by the vibration applying device that is arranged at a position different from a position where the vibration detecting device is mounted is transmitted to the position where the vibration detecting device is mounted through the frame so that the vibration generated by a vibration source is reduced by producing an offset vibration at this position. More specifically, a single vibration damping system as a whole is composed of the frame on which the vibration applying device is mounted.

In addition, in case that element components such as the vibration detecting device or the vibration applying device are once mounted on the frame so as to constitute the integrally formed vibration damping system, it becomes difficult to dismount these element components from the frame. As a result of this, in case of verifying the function after constituting the vibration damping system, it is required to conduct diagnosis without dismounting the element components.

Then, it can be conceived that the control device to control the vibration applying device comprises a failure diagnosis mode to diagnose whether there is failure or not by driving the vibration applying device in a previously determined condition wherein each element component is remained to be mounted on the frame and verifying whether the vibration damping system runs properly or not, in addition to a normal mode to damp vibration.

PRIOR ART DOCUMENT

Patent Document

Patent document 1: Japanese Unexamined Patent Application Publication No. 2009-275814

DISCLOSURE OF THE INVENTION

Problems to be Solved by the Invention

However, even though a case that the control device comprises the failure diagnosis mode, if the diagnosis whether there is failure or not is inaccurate, it becomes difficult to judge whether there is securely failure or not unless the element components constituting the vibration damping system are dismounted from the frame.

In addition, in order to conduct judgment securely, it can be conceived that the vibration applying device is largely driven for a long period of time and the vibration generated by the vibration applying device is detected. However, with this arrangement, energy consumption increases so that environmental load also increases and cost required for maintenance increases because the time period required for diagnosis becomes long.

The present claimed invention intends to solve all of the problems and a main object of this invention is to provide a vibration damping system and a vehicle that can accurately diagnose failure in a state that the element components constituting the vibration damping system are installed without dismounting the element components and that can reduce energy consumption and shorten time required for diagnosis.

Means to Solve the Problems

In order to attain the above objects, the present claimed invention takes following measures.

More specifically, a vibration damping system in accordance with this invention is a vibration damping system that comprises a vibration applying device mounted on a frame, a vibration detecting device that detects vibration appearing at a reference point through the frame and that outputs a vibration detection signal, and a control device that controls the vibration applying device, and the control device comprises a voltage command producing part that produces a driving voltage command to drive the vibration applying device and a vibration failure diagnosis part that diagnoses whether there is failure or not based on the vibration detection signal output by the vibration detecting device. In executing a normal mode in which control to damp the vibration is conducted, the voltage command producing part produces the driving voltage command based on the vibration detection signal and makes the vibration applying device generate a vibration applying force according to the driving voltage command. In executing a failure diagnosis mode in which control to diagnose failure is conducted, the voltage command producing part produces the driving voltage command corresponding to a diagnosis frequency that is previously set at a frequency identical to either one of a resonance frequency of the frame and a resonance frequency of the vibration applying device or a predetermined frequency close to the resonance frequency and makes the vibration applying device generate the vibration applying force according to the driving voltage command, and the vibration failure diagnosis part diagnoses whether there is failure or not based on the vibration detection signal.

In accordance with this arrangement, in the normal mode, the voltage command producing part produces the driving voltage command based on the vibration detection signal obtained by the vibration detecting device, and makes the vibration applying device generate the vibration applying force in accordance with this driving voltage command so that it is possible to appropriately damp the vibration. On the other hand, in the failure diagnosis mode, the voltage command producing part produces the driving voltage command corresponding to the diagnosis frequency that is set at the frequency identical to the resonance frequency of the frame or the vibration applying device or the frequency near the resonance frequency and the vibration applying device is operated at the resonance frequency of the frame or the vibration applying device or at the frequency near the resonance frequency so that it is possible to generate the big vibration at the reference point by making use of the resonance phenomenon with less energy. As a result of this, since the big vibration detection signal can be obtained by the vibration detecting device, it is possible to conduct the diagnosis whether there is failure or not more accurately based on the vibration detection signal by the vibration failure diagnosis part without dismounting the element components constituting the vibration damping system. Furthermore, since it is also possible to conduct the diagnosis whether there is failure or not quickly by vibrating the frame largely, the time required for failure diagnosis can be shortened.

In addition, in order to make it possible to more accurately diagnose whether there is failure or not by obtaining the big vibration detection signal with lesser energy while obtaining the big vibration by making use of the resonance phenomenon, it is preferable that the vibration failure diagnosis part comprises a vibration stable judging part that judges the vibration detection signal is in the stable state and that outputs a stable judgment signal, and a vibration failure detecting part that compares the vibration detection signal with a previously determined normal vibration reference value and that outputs a vibration failure detection signal in case that the vibration detection signal is smaller than the normal vibration reference value, and the vibration failure detecting part compares the vibration detection signal with the normal vibration reference value in case that output of the driving voltage command to the vibration applying device is initiated and the stable judgment signal is input by the vibration stable judging part.

Furthermore, in order to make it possible to judge that the vibration detection signal becomes in the stable state easily and quickly, it is preferable that in case that a difference between a peak value in one cycle of the vibration detection signal and a peak value in a cycle immediately previous to the cycle becomes smaller than the previously determined vibration stable reference value, the vibration stable judging part judges that the vibration detection signal is in the stable state and outputs the stable judgment signal.

In addition, in order to make it possible to easily specify a failure portion concretely in case that it is diagnosed there is failure, it is preferable that an electric current detecting device that detects a driving electric current supplied to the vibration applying device and that outputs an electric current detection signal is provided, and the control device comprises an electric current failure diagnosis part that diagnoses whether there is failure or not based on the electric current detection signal output by the electric current detecting device.

In order to realize a vehicle that can damp the vibration preferably by comprising the above-mentioned vibration damping system and diagnose the failure of the vibration damping system easily, it is preferable that the frame constitutes at least one part of a body of the vehicle.

Effect of the Invention

In accordance with the above-explained present claimed invention, it is possible to provide a vibration damping system and a vehicle that can accurately diagnose failure in a state that element components constituting the vibration damping system are remained to be installed without dismounting the element components and that can reduce energy consumption and shorten the time required for failure diagnosis.

BEST MODES OF EMBODYING THE INVENTION

One embodiment of this invention will be explained with reference to drawings.

Figure 1:
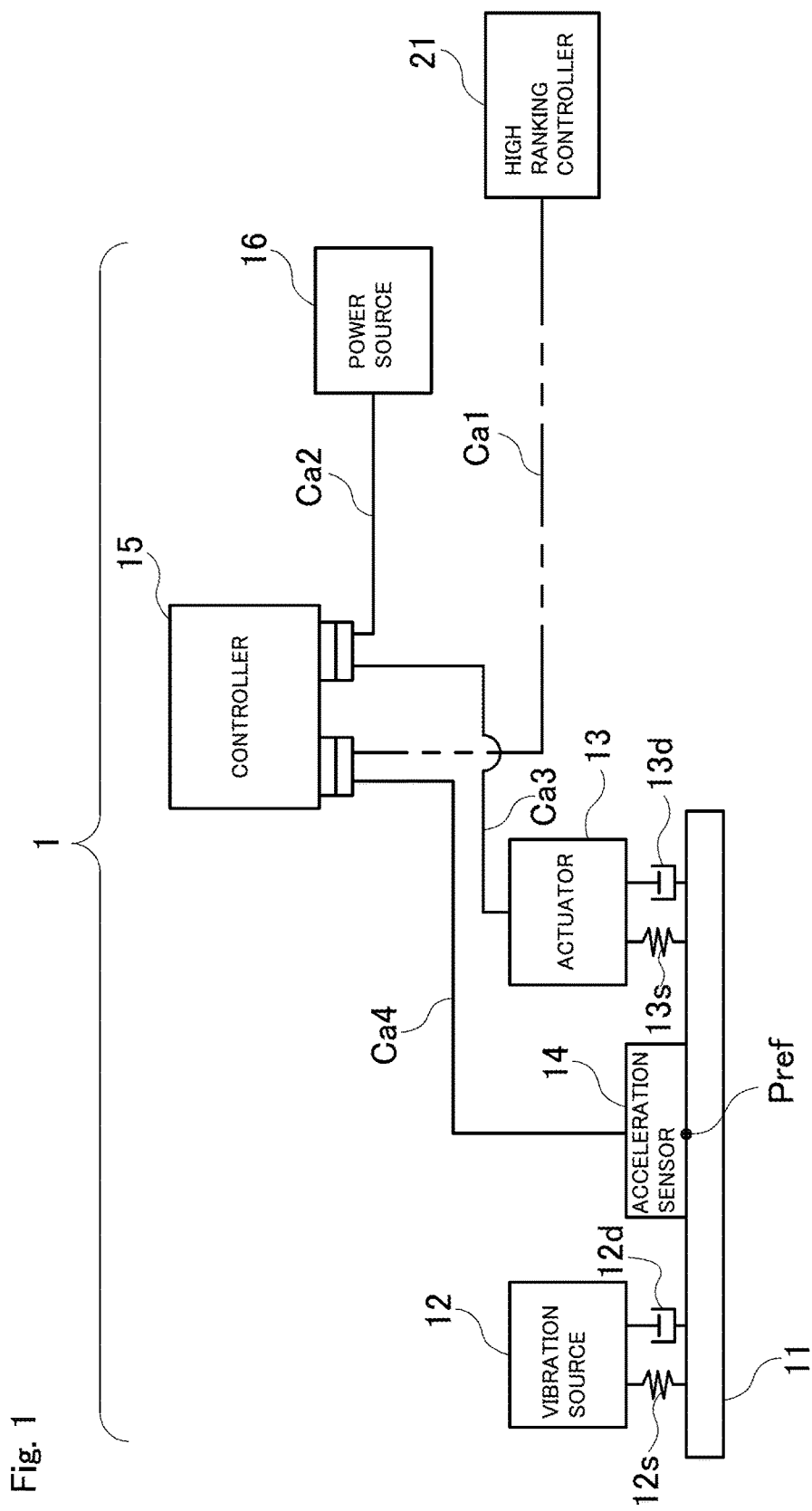
FIG. 1 is a block diagram showing a general configuration of a vibration damping system in accordance with one embodiment of this invention.

A vibration damping system 1 of this embodiment is loaded on a vehicle as an object to damp vibration, and integrally formed with a frame 11 that constitutes a vehicle body as shown in FIG. 1. An engine 12 as being a vibration source is supported by the frame 11 through a spring 12s and a damper 12d and vibration by driving the engine 12 is transmitted to the frame 11.

Furthermore, the vibration damping system 1 comprises an acceleration sensor 14 as being a vibration sensor mounted at a reference point (Pref) set at one part of the frame 11, an actuator 13 as being a vibration applying device arranged on a position of the frame 11 separated from the engine 12 and the acceleration sensor 14, a power source 16 that supplies electric power to drive the actuator 13, and a controller 15 connected to the acceleration sensor 14, the actuator 13 and the power source 16. The power source 16, the actuator 13 and the acceleration sensor 14 are connected to the controller 15 through a power source cable Ca2, an actuator cable Ca3, and a sensor cable Ca4 respectively and independently.

Furthermore, a high ranking controller 21 is connected to the controller 15 through a communication cable Ca1, and the controller 15 behaves in accordance with a command from the high ranking controller 21 and drives the actuator 13 by making use of an electric power obtained from the power source 16 based on a signal from the acceleration sensor 14.

In this embodiment, the acceleration sensor 14 is used as the vibration sensor, however, a displacement sensor or a speed sensor also may be used. It is also possible to extract the same signal by transforming the signal appropriately by the use of a differentiation circuit.

Figure 2:
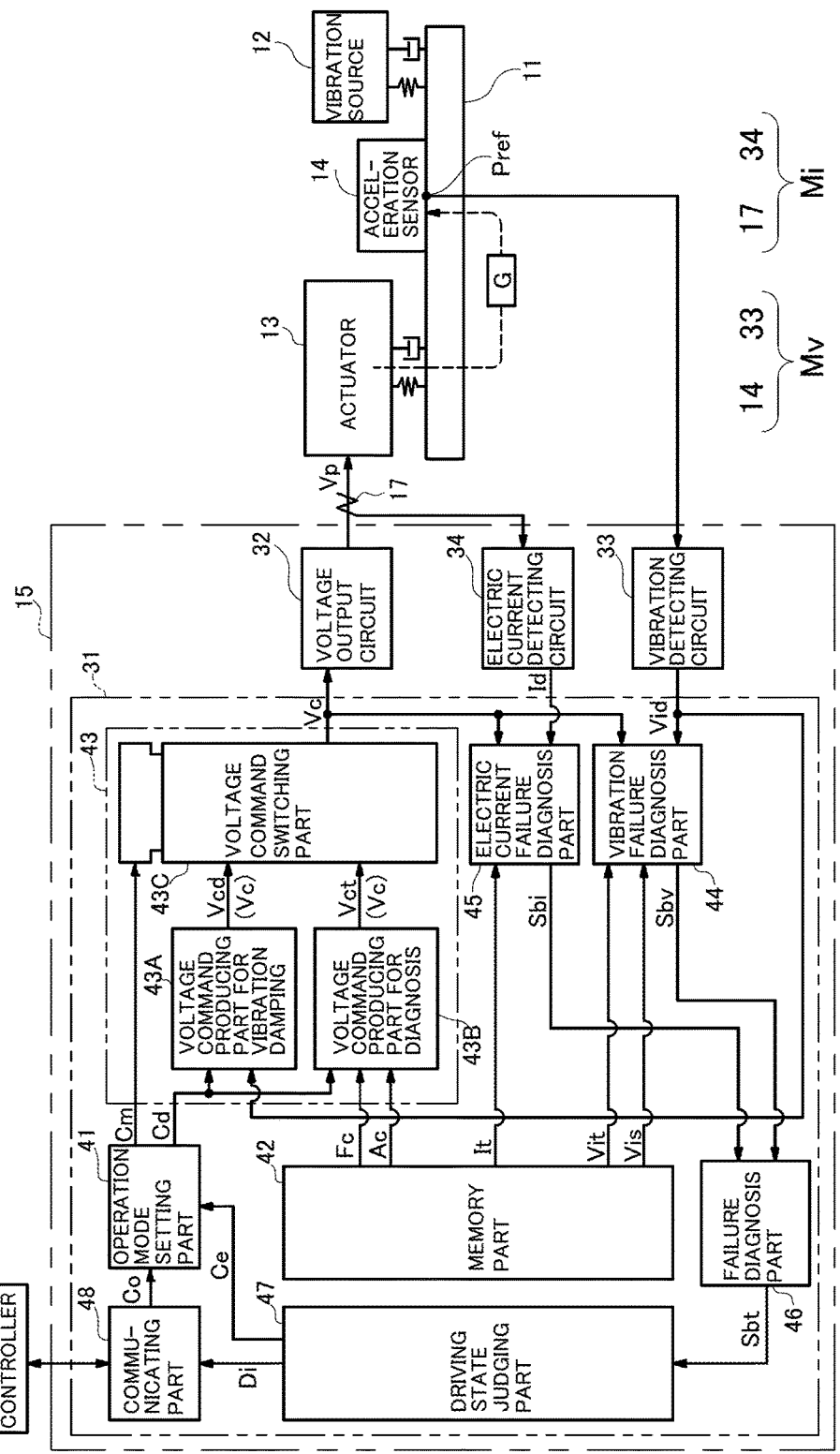
FIG. 2 is a block diagram showing a configuration of a controller of the vibration damping system.

In addition, the actuator 13 that is utilized as the vibration applying device is a linear actuator that is generally called as a reciprocating motor wherein a shaft as a movable element makes linear reciprocating movements, and an actuator used in the above-mentioned patent document 1 may be preferably utilized (refer to FIG. 2 in the patent document 1). The actuator 13 used in this embodiment is also of the same configuration wherein the shaft is elastically supported inside of a stator by a flat spring, the shaft is made of an iron core, and a permanent magnet and a coil are provided for the stator. The shaft can be moved by change of a magnetic flux that produces inside of the stator when a driving electric current flows in the coil, and it is possible for the shaft to make linear reciprocating movements by changing a direction of the electric current. Since the actuator 13 having this structure is of a moving core type and the shaft has a simple arrangement, it is advantageous in stability of behavior and mechanical strength. In addition, since the shaft is elastically supported by the flat spring, there is less sliding part so that energy loss is small and change in characteristics is small even though a long term use.

Although the actuator 13 is directly fixed to the frame 11, it can be conceived that the actuator 13 is connected to the frame 11 through a spring 13s and a damper 13d as shown in FIG. 1 by combining and modeling a supporting rigidity of the actuator 13 to the frame 11 and a supporting rigidity of a movable part inside of the actuator 13.

FIG. 2 is a block diagram to explain a configuration of the controller 15. The controller 15 comprises a control device 31, a voltage output circuit 32 to be connected to the control device 31, a vibration detecting circuit 33 and an electric current detecting circuit 34.

The voltage output circuit 32 functions as a voltage output device to output a driving voltage (Vp) to the actuator 13, and can produce and output the corresponding driving voltage (Vp) according to a driving voltage command (Vc) output by the control device 31. The driving electric current corresponding to the driving voltage (Vp) is supplied to the actuator 13 by the driving voltage (Vp) applied to the actuator 13 through the voltage output circuit 32.

The vibration detecting circuit 33, to which a signal obtained by the acceleration sensor 14 is input, produces and outputs a vibration detection signal (Vid) corresponding to a waveform of an acceleration in accordance with the input signal, and constitutes a vibration detecting device (Mv) together with the acceleration sensor 14.

The electric current detecting circuit 34, to which a signal obtained by the electric current detector 17 arranged between the voltage output circuit 32 and the actuator 13 is input, produces and outputs an electric current detection signal (Id) in accordance with the driving electric current that is supplied to the actuator 13 through the voltage output circuit 32, and constitutes an electric current detecting device (Mi) together with the electric current detector 17.

The control device 31 is made of an ordinary micro processor comprising a CPU, a memory and an interface. Programs that is necessary for processing are previously stored in the memory, and the CPU takes out and executes the necessary programs one by one and executes expected functions by cooperating with peripheral hard resources. The control device 31 is provided with two operating modes; a normal mode to conduct control for restraining vibration and a failure diagnosis mode to conduct control for diagnosing whether there is failure in the vibration damping system 1 or not. It is possible for the control device 31 to conduct control by selecting either one of the operating modes.

The failure in this embodiment includes both an initial failure just after manufacture and assembly and a failure due to aged deterioration or damage of components. The failure that can be assumed are wrong or disconnecting wiring, output abnormality of the acceleration sensor 14, output abnormality of the driving voltage (Vc) from the controller 15 to the actuator 13 and behavior abnormality of the actuator 13.

The control device 31 will be explained in detail by being divided into function blocks. The control device 31 comprises an operating mode setting part 41, a memory part 42, a voltage command producing part 43, a vibration failure diagnosis part 44, an electric current failure diagnosis part 45, a failure diagnosis part 46, a driving state judging part 47 and a communicating part 48.

The operating mode setting part 41 receives an operation command (Co) given from the above-mentioned high ranking controller 21 through the communicating part 48 and outputs the operation mode command (Cm) for setting the operation mode to the voltage command switching part 43c constituting the voltage command producing part 43. The operating mode setting part 41 also outputs a driving command (Cd) to initiate or halt a control operation in each operating mode to a voltage command producing part 43A for vibration damping, to be described later, or a voltage command producing part 43B for diagnoses. In addition, in case that a halt command (Ce) is input by the driving state judging part 47, it is also possible for the operation mode setting part 41 to halt the control operation in each operation mode by outputting the driving command (Cd) corresponding to the halt command (Ce).

The memory part 42 stores a diagnosis frequency (Fc) and a diagnosis voltage amplitude (Ac) as being a previously set driving condition of the actuator 13 at a time of failure diagnosis and also stores a normal vibration reference value (Vit), a vibration stable reference value (Vis) and a normal electric current reference value (It) as being a reference value used for failure diagnosis.

In this embodiment, the normal vibration reference value (Vit) is a reference value to make a judgment of being normal in case that the vibration detection signal (Vid) that is bigger than the normal vibration reference value (Vit) is obtained, and to make a judgment of failure in the behavior of the actuator 13 or failure in a portion that is related to detection of vibration in case that the vibration detection signal (Vid) that is smaller than the normal vibration reference value (Vit) is obtained. In addition, the normal electric current reference value (It) is a reference value to make a judgment of being normal in case that the electric current detection signal (Ig) that is bigger than the normal electric current reference value (It) is obtained, and to make a judgment of failure in production of the driving voltage (Vp) or failure in a portion that is related to detection of the electric current in case that the electric current detection signal (Ig) that is smaller than the normal electric current reference value (It) is obtained. Furthermore, the vibration stable reference value (Vis) is a reference value to make a judgment that the vibration detection signal (Vid) is stable, namely the vibration is stable in case that a change amount of a peak value of the vibration detection signal (Vid) is below the vibration stable reference value (Vis).

Furthermore, the above-mentioned diagnosis frequency (Fc) is a frequency at a time of when the actuator 13 is driven in the failure diagnosis mode, and is set as a predetermined frequency near a resonance frequency of the frame 11. The resonance frequency of the frame 11 in this embodiment depends on not only a shape or a material of the frame 11 but also a supporting structure to support the frame 11. The resonance frequency of the frame 11 is also regarded as a resonance frequency of whole of the vibration system (system) composed mainly of the frame 11, and indicates a frequency that produces large vibration to the frame 11 due to a resonance phenomenon in case that the vibration is applied at this frequency. In addition, the frequency near the resonance frequency is a frequency that does not coincide with the resonance frequency and that produces large vibration because of the resonance phenomenon similar to a case wherein the vibration is applied at the resonance frequency even though the vibration is applied at the frequency near the resonance frequency, and for example, in case that the vibration is sharp at the resonance frequency, namely in case that the "Q" value is big, the frequency near the resonance frequency may be set ±3%, and in case that the "Q" value is small, it may be set within ±5%.

By setting the diagnosis frequency (Fc) as mentioned above, it is possible to produce large vibration because of the resonance phenomenon even though the vibration is applied with less energy. It is a matter of course that the diagnosis frequency (Fc) may be set to be identical with the resonance frequency of the frame 11, and in this case, it is possible to produce the resonance phenomenon more conspicuously so that further larger vibration can be obtained at the reference point (Pref).

The voltage command producing part 43 produces the driving voltage command (Vc) in accordance with the input signal and outputs the driving voltage command (Vc) to the above-mentioned voltage output circuit 32. The voltage command producing part 43 comprises the voltage command producing part for vibration damping 43A to produce the driving voltage command (Vc) in the normal mode, the voltage command producing part for diagnosis 43B to produce the driving voltage command (Vc) in the failure diagnosis mode and the voltage command switching part 43C to selectively output either one of the output from the voltage command producing part for vibration damping 43A and the output from the voltage command producing part for diagnosis 43B as the driving voltage command (Vc).

The voltage command producing part for vibration damping 43A is operated when the driving command (Cd) corresponding to initiation of a control operation is input by the operating mode setting part 41, and produces the driving voltage command for vibration damping (Vcd) that generates offset vibration at the reference point (Pref) to offset the vibration that is produced at the reference point (Pref) as one of the driving voltage commands (Vc). More concretely, since the vibration applying force generated by the actuator 13 changes based on a transfer function (G) between the actuator 13 and the reference point (Pref) and then appears at the reference point (Pref), in case that desired vibration is to be generated at the reference point (Pref), it is possible to obtain the vibration applying force to be generated to the actuator 13 based on an inverse transfer function (1/G) as being an inverse characteristic of the above-mentioned transfer function (G) and the vibration waveform of the desired vibration. Then, in this embodiment, the voltage command producing part for vibration damping 43A produces a driving voltage command for vibration damping (Vcd) based on an opposite phase signal that is an inversed vibration detection signal (Vid) and the inverse transfer function (1/G). In addition, the voltage command producing part for vibration damping 43A halts production and output of the driving voltage command for vibration damping (Vcd) when the driving command (Cd) corresponding to halt of the control operation is input by the operating mode setting part 41.

The voltage command producing part for diagnosis 43B is operated when the driving command (Cd) corresponding to initiation of the control operation is input by the operating mode setting part 41, reads out the diagnosis frequency (Fc) and a diagnosis voltage amplitude (Ac) stored in the memory part 42 and produces a driving voltage command for diagnosis (Vct) as an alternating current voltage command having a rectangular waveform as one of the driving voltage commands (Vc) based on the readout diagnosis frequency (Fc) and diagnosis voltage amplitude (Ac). A frequency of the driving voltage command for diagnosis (Vct) coincides with the diagnosis frequency (Fc) that is previously set, and an amplitude of the driving voltage command for diagnosis (Vct) is in proportion to the diagnosis voltage amplitude (Ac). In addition, the voltage command producing part for diagnosis 43B also halts production and output of the driving voltage command for diagnosis (Vct) when the driving command (Cd) corresponding to halt of the control operation is input by the operating mode setting part 41.

The voltage command switching part 43C selectively switches the voltage command producing part for vibration damping 43A and the voltage command producing part for diagnosis 43B so that either one of the voltage command producing part for vibration damping 43A and the voltage command producing part for diagnosis 43B is connected to an output line to the voltage output circuit 32 in accordance with the operation mode command (Cm) input by the above-mentioned operating mode setting part 41. In accordance with this arrangement, either one of the driving voltage command for vibration damping (Vcd) from the voltage command producing part for vibration damping 43A and the driving voltage command for diagnosis (Vct) from the voltage command producing part for diagnosis 43B is output to the voltage output circuit 32 as the driving voltage command (Vc) according to the operation mode.

The vibration failure diagnosis part 44 diagnoses whether there is failure or not in the behavior of the actuator 13 or at a portion related to detection of vibration based on the vibration detection signal (Vid) obtained by the vibration detecting device (Mv), the driving voltage command (Vc) (the driving voltage command for diagnosis (Vct)) obtained by the voltage command producing part 43, and the normal vibration reference value (Vit), the vibration stable reference value (Vis) read out from the memory part 42, and in case it is diagnosed that there is failure, a vibration failure detection signal (Sbv) is output A concrete configuration will be explained later.

In addition, the electric current failure diagnosis part 45 diagnoses whether there is failure or not in the production of the driving voltage (Vp) or at a portion related to detection of the electric current based on the electric current detection signal (Id) obtained by the electric current detecting device (Mi) and the normal electric current reference value (It) read out from the memory part 42, and in case it is diagnosed that there is failure, an electric current failure detection signal (Sbi) is output. A concrete configuration also will be explained later.

When at least either one of the vibration failure detection signal (Sbv) from the vibration failure diagnosis part 44 and the electric current failure detection signal (Sbi) from the electric current failure diagnosis part 45 is input, the failure diagnosis part 46 outputs a failure judgment signal (Sbt) as there is failure in either portion. The failure detection signal (Sbt) includes information which makes it possible to judge whether either of the vibration failure detection signal (Sbv) and the electric current failure detection signal (Sbi) is output, or both of them are output. With this arrangement, in case that it is diagnosed there is failure, it facilitates specifying a concrete failure portion.

When the failure judgment signal (Sbt) by the failure diagnosis part 46 is input, the driving state judging part 47 judges whether there is failure or not, outputs the result as operation information (Di) and transmits the result to the high ranking controller 21 through the communicating part 48. As a result of this, the result is informed to an operator. In addition, in case that it is judged there is failure based on the input of the failure judgment signal (Sbt), the driving command (Cd) to halt the control operation is output by the operating mode setting part 41 by outputting the halt command (Ce) to the operating mode setting part 41. With this arrangement, the operation in a state wherein failure exists is immediately ceased so that it is also possible to prevent expansion of failure of the components.

Furthermore, the driving state judging part 47 not only judges whether there is failure or not but also collects information on the operating state of the controller 15 at a time when the failure judgment signal (Sbt) is input and transfers the information as the operation information (Di) to the high ranking controller 21 through the communicating part 48. As the operation information (Di), there are information on an abnormal state generating situation such as overcurrent, overvoltage and breaking of wire, information on an operating mode such as an initial setting mode, a sleep mode and a normal mode and information on a movement value such as a voltage command value, an electric current detected value, a vibration detected value and a temperature detected value, however, other information may be added appropriately to the operation information (Di).

In addition, the existence of a portion of failure that can be judged by the failure judgment signal (Sbt) not only is transferred to the operator through the driving state judging part 47 and the high ranking controller 21 but also may be directly transferred to the operator by the controller 15 by providing the failure diagnosis part 46 or the driving state judging part 47 with an alarm function such as a voice output or emission of light.

The communicating part 48 serves as an interface to send or receive the information to or from the high ranking controller 21. The communicating part 48 can give an operation command (Co) from the high ranking controller 21 to the operation mode setting part 41 or transfer the operation information (Di) obtained from the driving state judging part 47 to the high ranking controller 21. In addition, the communicating part 48 appropriately sends or receives the information other than the above-mentioned information and it is possible for the high ranking controller 21 to conduct more precise control based on the information.

In accordance with the above-mentioned arrangement, in case that the normal mode is set by the operation mode setting part 41 and the operation mode command (Cm) in accordance with the normal mode is output, the voltage command switching part 43C switches the mode so as to output the driving voltage command (Vc) from the voltage command producing part for vibration damping 43A. Furthermore, when the driving command (Cd) corresponding to initiation of the control operation is input by the operation mode setting part 41, the voltage command producing part for vibration damping 43A initiates production of the driving voltage command for vibration damping (Vcd) to generate a cancelling vibration for cancelling the vibration transferred from the vibration source 12 to the reference point (Pref) based on the vibration detection signal (Vid) obtained by the acceleration sensor 14 arranged at the reference point (Pref) and outputs the driving voltage command for vibration damping (Vcd) as the driving voltage command (Vc). Then, the voltage output circuit 32 produces the driving voltage (Vp) according to the driving voltage command for vibration damping (Vcd) by making use of an electric power obtained from the power source 16 (refer to FIG. 1) and inputs the produced driving voltage (Vp) to the actuator 13. As a result of this, the actuator 13 generates the vibration applying force according to the driving voltage command for vibration damping (Vcd) and the generated vibration applying force produces the cancelling vibration at the reference point (Pref) through the frame 11 so that it is possible to restrain the vibration generating at the reference point (Pref) by the vibration source 12.

In addition, in case that the failure diagnosis mode is set by the operation mode setting part 41 and the operation mode command (Cm) according to the failure diagnosis mode is output, the voltage command switching part 43C switches the mode so as to output the driving voltage command (Vc) from the voltage command producing part for diagnosis 43B. Furthermore, when the diving command (Cd) corresponding to the initiation of the control operation is input by the operation mode setting part 41, the voltage command producing part for diagnosis 43B initiates production of the driving voltage command for diagnosis (Vct) as being an alternating current voltage command having a rectangular waveform based on the diagnosis frequency (Fc) and the diagnosis voltage amplitude (Ac) stored in the memory part 42 and outputs the produced driving voltage command for diagnosis (Vct) as the driving voltage command (Vc). Then, the voltage output circuit 32 produces the driving voltage (Vp) according to the driving voltage command for diagnosis (Vct) by making use of the electric power obtained from the power source 16 (refer to FIG. 1) and inputs the produced driving voltage (Vp) to the actuator 13. As a result of this, the actuator 13 generates the vibration applying force according to the driving voltage command for diagnosis (Vct), more specifically, the above-mentioned diagnosis frequency (Fc) and the diagnosis voltage amplitude (Ac).

Furthermore, in case that a halt command (Ce) to halt each operating mode is output by the operation mode setting part 41, production of the driving voltage command (Vc) by the voltage command producing part 43 is halted in any mode, and no driving voltage (Vp) is output to the actuator 13. Similar to this, in case that the halt command (Ce) is output from the driving state judging part 47, no driving voltage (Vp) is output.

As mentioned above, since the diagnosis frequency (Fc) is set to be a predetermined value close to the resonance frequency of the frame 11 in this embodiment, if the actuator 13 is operated at the diagnosis frequency (Fc) in case of executing the failure diagnosis mode, it is possible to produce big vibration to the frame 11 by making use of the resonance phenomenon. The vibration generated at the reference point (Pref) is detected by the use of the vibration detecting device (Mv) and the vibration detection signal (Vid) obtained by the vibration detecting device (Mv) is compared with the normal vibration reference value (Vit) so that it is possible to diagnose where there is failure or not in the behavior of the actuator 13 or at a portion related to detection of the vibration, to be described later. More specifically, since it is possible to obtain sufficiently big vibration to judge whether there is failure or not by making use of the resonance phenomenon, it is possible not only to lessen the energy given to the actuator 13 from the power source 16 (refer to FIG. 1) but also to conduct more accurate diagnosis similar to a case of improving a detection sensitivity of the sensor.

A concrete mechanism of the failure diagnosis will be explained in detail.

Figure 3:
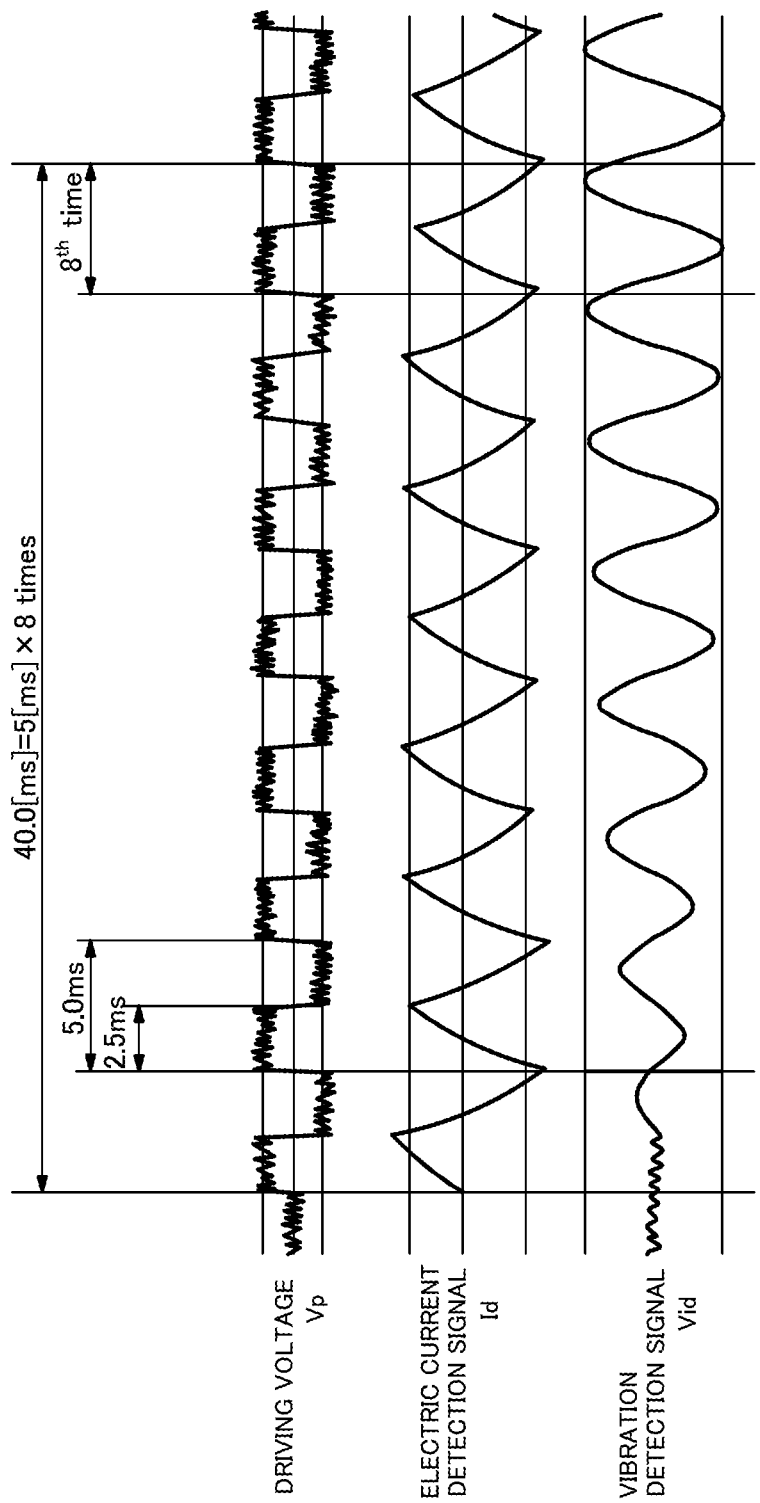
FIG. 3 is a view showing one example of a driving voltage and waveforms of each detection signal of the vibration damping system.

FIG. 3 is a view showing one example of the driving voltage (Vp), the electric current detection signal (Id) and the vibration detection signal (Vid) obtained at a time of executing the failure diagnosis mode. First, a characteristic of each signal will be explained by the use of FIG. 3 while referencing to FIG. 2.

As mentioned above, since the driving voltage (Vp) obeys the driving voltage command for diagnosis (Vct) and the driving voltage command for diagnosis (Vct) is set to be of a rectangular waveform due to the previously determined diagnosis frequency (Fc) and diagnosis voltage amplitude (Ac), the driving voltage (Vp) is output as an alternating voltage that changes in a rectangular waveform as shown in FIG. 3.

In this embodiment, the resonance frequency of the frame 11 is set to be 200 Hz as one example, and the diagnosis frequency (Fc) is set to be 200 Hz to be tailored to the resonance frequency. Then, one cycle of the driving voltage (Vp) is 5.0 ms and positive and negative are reversed at every 2.5 ms as being a half-cycle.

The driving electric current that is supplied to the actuator 13 at a time when the driving voltage (Vp) is applied is detected by the electric current detecting device (Mi) so that the electric current detection signal (Id) of a chopping waveform can be obtained as shown in FIG. 3. More concretely, in case that the driving voltage (Vp) becomes a positive voltage, the electric current detection signal (Id) increases almost linearly due to a first order lag having a time constant of L/R because of an armature characteristics of the actuator 13, and showed a peak value in the positive side in case that the driving voltage (Vp) is shifted to the negative voltage, and from this time the electric current detection signal (Id) decreases almost linearly due to the first order lag and is shifted to the negative side during this process. The electric current value in the negative side means that the electric current flows in a reverse direction as the electric current in the positive side flows. Furthermore, in case that the driving voltage (Vp) is shifted to the positive voltage, the electric current detection signal (Id) shows the peak value in the negative side, and from this time the electric current detection signal (Id) increases almost linearly and is shifted to the positive side during this process.

Due to the change of the driving electric current, change in a magnetic flux to move the shaft (not shown in drawings) of the actuator 13 generates, a reactive force in accordance with the movement of the shaft is transferred to the frame 11 as the vibration applying force and then the vibration detection signal (Vid) is obtained by the vibration detecting device (Mv) because the reference point (Pref) vibrates.

The vibration detection signal (Vid) changes with the same cycle as that of the electric current detection signal (Id) although a phase delay of about 90 degree generates relative to the electric current detection signal (Id) due to an electric characteristics of the actuator 13. An amplitude of the vibration detection signal (Vid) gradually increases at a time when the actuator 13 initiates moving and then reaches in the stable state wherein the amplitude is nearly constant. Nearly no change in the amplitude shows in the eighth cycle in FIG. 3, and the vibration is stabilized. In this example, the vibration is stabilized in the eighth cycle, however, a time required for stabilizing the vibration may vary depending on a shape of each component, a supporting condition or a way to give the vibration.

A cause to generate the change in the amplitude depends on a characteristic of the vibration at a time of resonance. More specifically, in case of applying vibration near at the resonance frequency, since the amplitude of the vibration gradually increases from the initiation of applying vibration due to an influence of the attenuation coefficient and is finally saturated, it takes time to stabilize the amplitude. Then, in this invention, not only the vibration is increased by the resonance but also the diagnosis is conducted in the stable state wherein the vibration grows much more. As a result of this, it is possible not only to obtain big vibration with less energy but also to conduct an accurate diagnosis in a state of bigger vibration.

Figure 4:
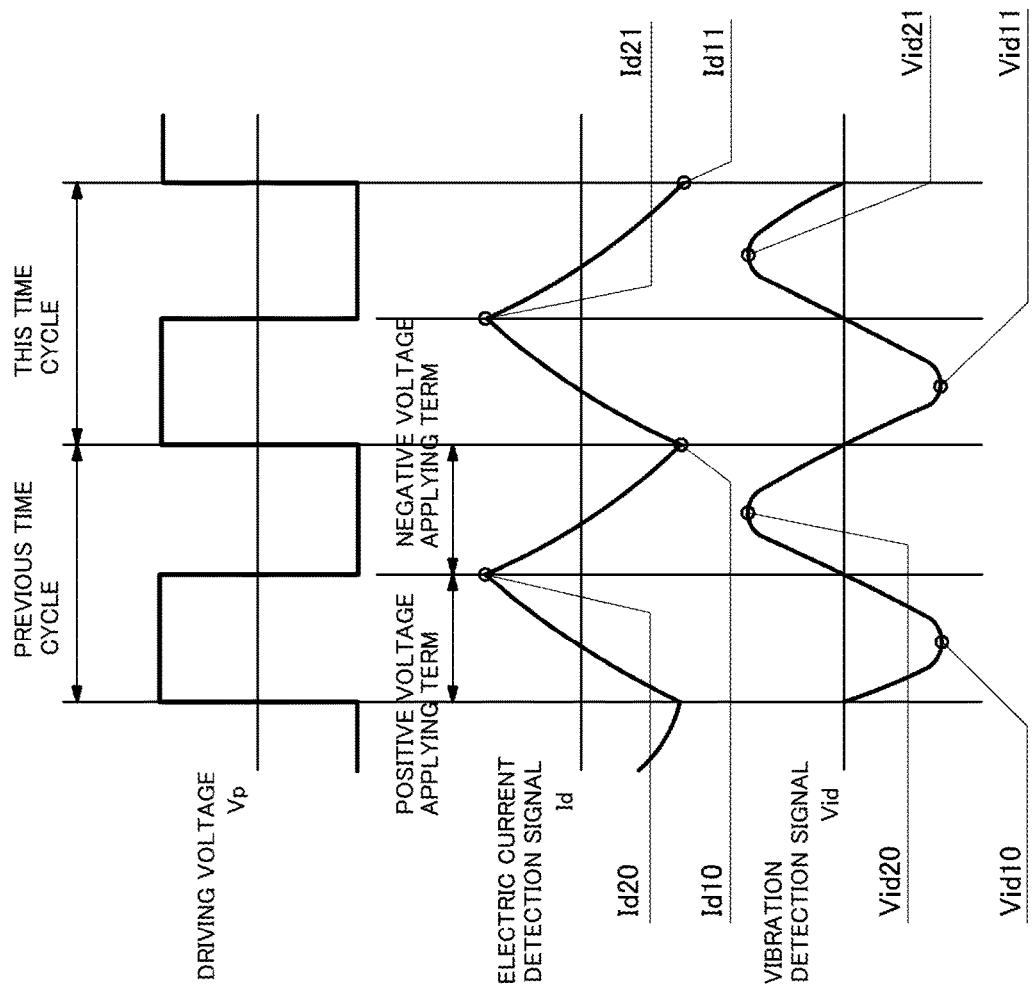
FIG. 4 is a pattern diagram showing a relationship between the driving voltage and each detection signal of the vibration damping system.

In order to realize the above-mentioned content, this invention is provided with a device to judge the stable state of the vibration. A principle to judge the stable state in this embodiment will be explained with reference to FIG. 4. FIG. 4 schematically describes a relationship between the driving voltage (Vp), the electric current detection signal (Id) and the vibration detection signal (Vid).

The driving voltage (Vp) is an alternating voltage wherein a positive voltage and a negative voltage are alternately repeated in a rectangular wave shape, and the electric current detection signal (Id) increases almost linearly while the positive voltage is applied and decreases almost linearly while the negative voltage is applied. As a result of this, in case that the vibration damping system 1 works normally, the electric current detection signal (Id) reads the peak value in the positive side at a falling time, so-called when the driving voltage (Vp) turns from the positive to the negative, and the electric current detection signal (Id) reads the peak value in the negative side at a rising time, so-called when the driving voltage (Vp) turns from the negative to the positive.

In case that a cycle from the rise time to a next rise time of the driving voltage (Vp) is used for evaluation as one cycle at this time, this time maximum electric current detected value (Id21) as being the peak value in the positive side and this time minimum electric current detected value (Id11) as being the peak value in the negative side are detected and the absolute value of the maximum electric current detected value (Id21) and the absolute value of the minimum electric current detected value (Id11) are compared with the previously determined normal electric current reference value (It) (refer to FIG. 2). The diagnosis is conducted whether there is the failure or not in the production of the driving voltage (Vp) or a portion related to detection of the electric current whether or not the absolute value is sufficiently big relative to the normal electric current reference value (It). If the amplitude of the driving voltage (Vp) is stable, it is possible for the electric current detection signal (Id) to immediately flow the stable electric current irrespective of the resonance. As a result of this, if normal, there is almost no change between the previous time maximum electric current detected value (Id20) and the previous time minimum electric current detected value (Id10) in the previous cycle and this time maximum electric current detected value (Id21) and this time minimum electric current detected value (Id11) in this cycle so that it is possible to conduct the diagnosis by the use of the detected value in any cycle.

In addition, the vibration detection signal (Vid) also changes in accordance with the driving voltage (Vp). The vibration detection signal (Vid) decreases while the positive voltage is applied and is shifted to increase at a time when the vibration detection signal (Vid) takes the peak value in the negative side. The vibration detection signal (Vid) increases while the negative voltage is applied and is shifted to decrease at a time when the vibration detection signal (Vid) takes the peak value in the positive side.

In case that a certain cycle is used for evaluation as a cycle at this time, this time minimum vibration detected value (Vid11) as being the peak value in the negative side and this time maximum vibration detected value (Vid21) as being the peak value in the positive side are detected and an absolute value of this time minimum vibration detected value (Vid11) and an absolute value of this minimum vibration detected value (Vid21) are compared with the previously determined normal vibration reference value (Vit) (refer to FIG. 2). This is the way to conduct the diagnosis whether there is failure or not in the movement of the actuator 13 or a portion related to detection of vibration.

A concrete configuration of the vibration failure diagnosis part 44 and a concrete configuration of the electric current failure diagnosis part 45 by making use of the above-mentioned characteristic of each detection signal will be explained.

Figure 5:
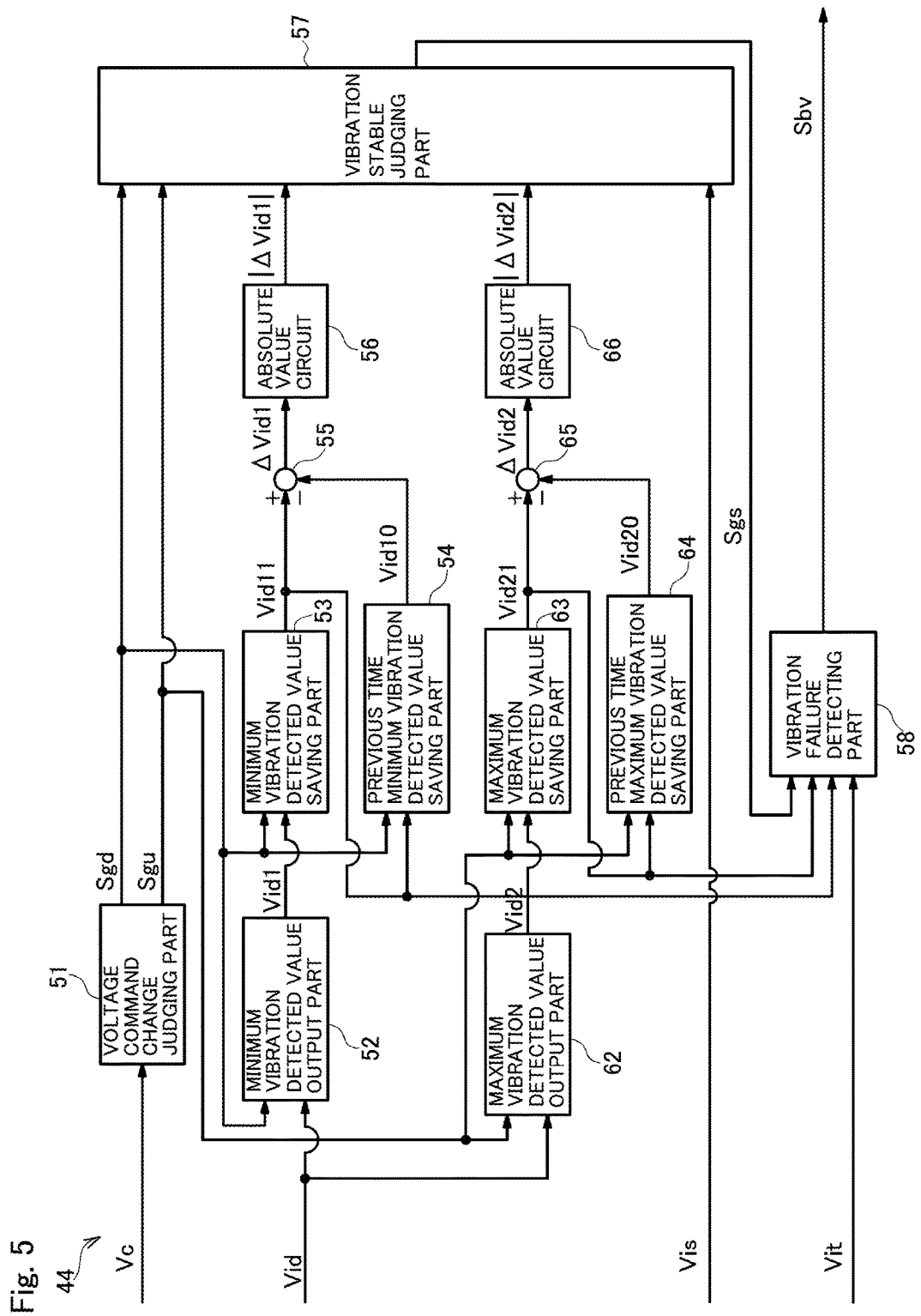
FIG. 5 is a block diagram showing a configuration of a vibration failure diagnosis part of the vibration damping system.

FIG. 5 is a block diagram showing the configuration of the vibration failure diagnosis part 44 described in FIG. 2 in detail. As shown in FIG. 5, the vibration failure diagnosis part 44 comprises a voltage command change judging part 51, a minimum vibration detected value output part 52, a minimum vibration detected value saving part 53, a previous time minimum vibration detected value saving part 54, a subtracter 55, an absolute value circuit 56, a maximum vibration detected value output part 62, a maximum vibration detected value saving part 63, a previous time maximum vibration detected value saving part 64, a subtracter 65, an absolute value circuit 66, a vibration stable judging part 57 and a vibration failure detecting part 58.

The voltage command change judging part 51 judges a change of the driving voltage command (Vc) and outputs a signal in accordance with the change of the driving voltage command (Vc).

Figure 6:
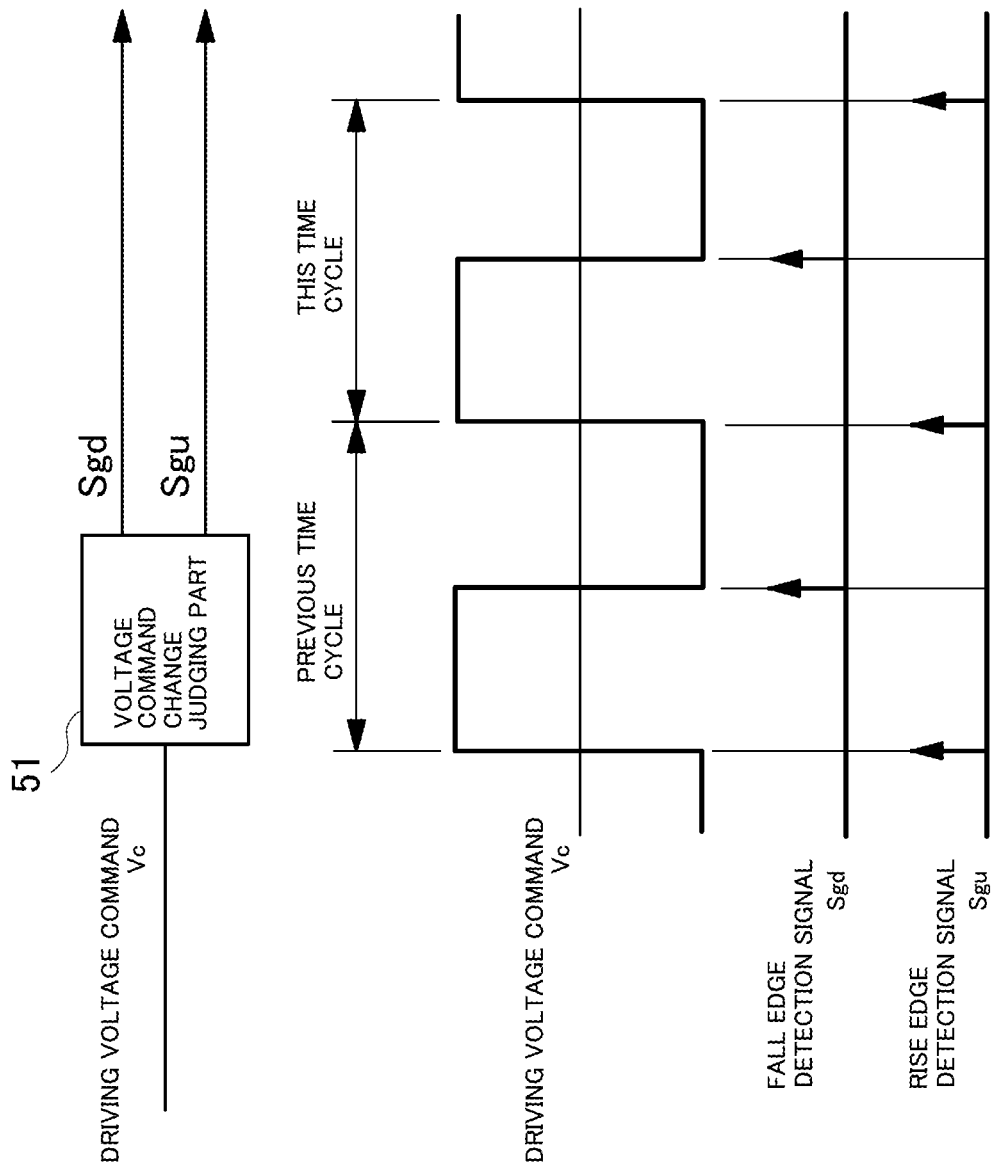
FIG. 6 is a view explaining behavior of a voltage command change judging part of the vibration damping system.

FIG. 6 is a view to explain a function of the voltage command change judging part 51. As shown in FIG. 6, the voltage command change judging part 51 outputs a rising edge detection signal (Sgu) of a pulse shape in case of detecting a rising edge wherein the driving voltage command (Vc) is shifted from the negative to the positive. Furthermore, the voltage command change judging part 51 outputs a fall edge detection signal (Sgd) of a pulse shape in case of detecting a fall edge wherein the driving voltage command (Vp) is shifted from the positive to the negative. Since the driving voltage (Vp) is produced by the voltage output circuit 32 (refer to FIG. 2) in accordance with the driving voltage command (Vc), the change the timing of the driving voltage command (Vc) is almost the same as the change the timing of the driving voltage command (Vp) so that detecting the rise edge and the fall edge of the driving voltage command (Vc) is almost the same as detecting the rise edge and the fall edge of the driving voltage command (Vp).

The explanation will be returned to FIG. 5. The minimum vibration detected value output part 52, to which the vibration detection signal (Vid) and the fall edge detection signal (Sgd) obtained by the voltage command change judging part 51 are input, produces and outputs the minimum vibration detected value (Vid1) in one cycle based on the vibration detection signal (Vid) and the fall edge detection signal (Sgd).

Figure 7:
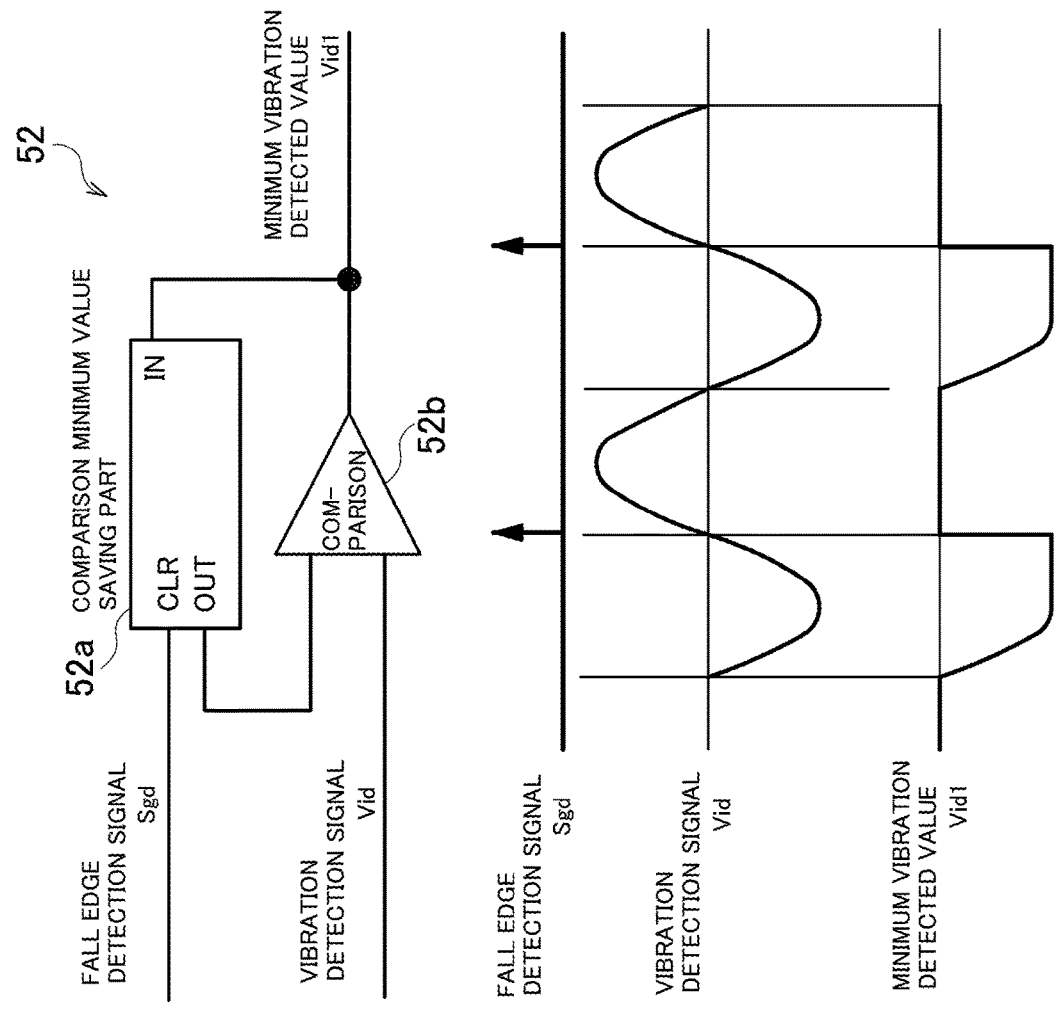
FIG. 7 is a view explaining a configuration and behavior of a minimum vibration detected value output part of the vibration damping system.

FIG. 7 is a view to show a configuration of the minimum vibration detected value output part 52 in more detail and to explain its function.

The minimum vibration detected value output part 52 comprises a comparison minimum value saving part 52a and a comparison circuit 52b. The comparison minimum value saving part 52a can output a signal input by an input part (IN) from an output part (OUT), and resets the signal output by the signal input to a reset part (CLR) to zero. The comparison circuit 52b compares the signal obtained by the output part (OUT) of the comparison minimum value saving part 52a with the vibration detection signal (Vid) and outputs the smaller one as the minimum vibration detected value (Vid1).

The minimum vibration detected value (Vid1) is input again to the comparison circuit (52b) through the comparison minimum value saving part 52a and compared with a newly obtained vibration detection signal (Vid) and then outputs the smaller one as the minimum vibration detected value (Vid1). More specifically, the comparison minimum value saving part 52a and the comparison circuit 52b comprise a function of self-saving the vibration detection signal (Vid) and a function of updating the minimum value.

In addition, the fall edge detection signal (Sgd) is input to the reset part (CLR) of the comparison minimum value saving part 52a and the minimum value of the vibration detection signal (Vid) is reset at the timing of falling of the driving voltage command (Vc).

Accordingly, since the minimum vibration detected value output part 52 resets the output value at the timing of the fall edge detection signal (Sgd) and the vibration detection signal (Vid) becomes zero at this time, the minimum vibration detected value (Vid1) also becomes zero. In addition, since the vibration detection signal (Vid) becomes a value bigger than zero during a half cycle, the minimum vibration detected value (Vid1) is not updated and keeps in a state of zero. The minimum vibration detected value (Vid1) is kept being updated by the vibration detection signal (Vid) while the vibration detection signal (Vid) is a negative value and kept decreasing. Soon after, the vibration detected value (Vid) becomes the peak value in the negative side and at a time when the vibration detected value (Vid) is shifted to increase, the minimum vibration detected value (Vid1) is kept to be the peak value of the vibration detection signal (Vid) in the negative side. Furthermore, when the fall edge detection signal (Sgd) is input, the minimum vibration detected value (Vid1) is reset and the same behavior of that described in the above is repeated.

The explanation will be returned to FIG. 5 again, the minimum vibration detected value saving part 53, to which the fall edge detection signal (Sgd) obtained by the voltage command change judging part 51 and the minimum vibration detected value (Vid1) obtained by the minimum vibration detected value output part 52 are input, outputs the minimum vibration detected value (Vid1) in a single cycle wherein the vibration is detected as this time minimum vibration detected value (Vid11). More concretely, at the timing when the fall edge detection signal (Sgd) is input, the minimum vibration detected value saving part 53 latches the minimum vibration detected value (Vid1) most recently input by the minimum vibration detected value output part 52 and outputs the latched minimum vibration detected value (Vid1) as this time minimum vibration detected value (Vid11). Then, when the fall edge detection signal (Sgd) is next input, the minimum vibration detected value (Vid1) the most recently input by the minimum vibration detected value output part 52 is newly latched and the latched minimum vibration detected value (Vid1) is output as the new this time minimum vibration detected value (Vid11) and the same behavior of that described in the above is repeated. More specifically, the minimum vibration detected value saving part 53 continuously outputs the peak value of the vibration detection signal (Vid) in the negative side in the immediately preceding single cycle as this time minimum vibration detected value (Vid11) during the single cycle.

The previous time minimum vibration detected value saving part 54, to which the fall edge detection signal (Sgd) obtained by the voltage command change judging part 51 and this time minimum vibration detected value (Vid11) obtained by the minimum vibration detected value saving part 53 are input, outputs the minimum vibration detected value (Vid1) in a cycle immediately previous to the cycle wherein the vibration is detected as the previous time minimum vibration detected value (Vid10). More concretely, at the timing when the fall edge detection signal (Sgd) is input, the previous time minimum vibration detected value saving part 54 latches this time minimum vibration detected value (Vid11) most recently input by the minimum vibration detected value saving part 53 and outputs the latched this time minimum vibration detected value (Vid11) as the previous time minimum vibration detected value (Vid10). Then, when the fall edge detection signal (Sgd) is next input, this time minimum vibration detected value (Vid11) the most recently input by the minimum vibration detected value saving part 53 is newly latched and the latched this time minimum vibration detected value (Vid11) is output as the new previous time minimum vibration detected value (Vid10) and the same behavior of that described in the above is repeated. More specifically, the previous time minimum vibration detected value saving part 54 continuously outputs the peak value of the vibration detection signal (Vid) in the negative side in a single cycle that is one more before the immediately preceding single cycle as the previous time minimum vibration detected value (Vid10) during the single cycle.

The subtracter 55 produces a difference between this time minimum vibration detected value (Vid11) obtained by the minimum vibration detected value saving part 53 and the previous time minimum vibration detected value (Vid10) obtained by the previous time minimum vibration detected value saving part 54 and outputs the difference as the minimum vibration difference ($\Delta$Vid1).

The absolute value circuit 56 takes an absolute value of the input minimum vibration difference ($\Delta$Vid1) and outputs the absolute value as the absolute value of the minimum vibration difference $|\Delta$Vid1$|$.

In order to produce this time minimum vibration detected value (Vid11) and the previous time minimum vibration detected value (Vid10), the minimum vibration detected value output part 52, the minimum vibration detected value saving part 53 and the previous time minimum vibration detected value saving part 54 are provided. Similar to this, in order to produce this time maximum vibration detected value (Vid21) and the previous time maximum vibration detected value (Vid20), the maximum vibration detected value output part 62, the maximum vibration detected value saving part 63 and the previous time maximum vibration detected value saving part 64 are provided.

Figure 8:
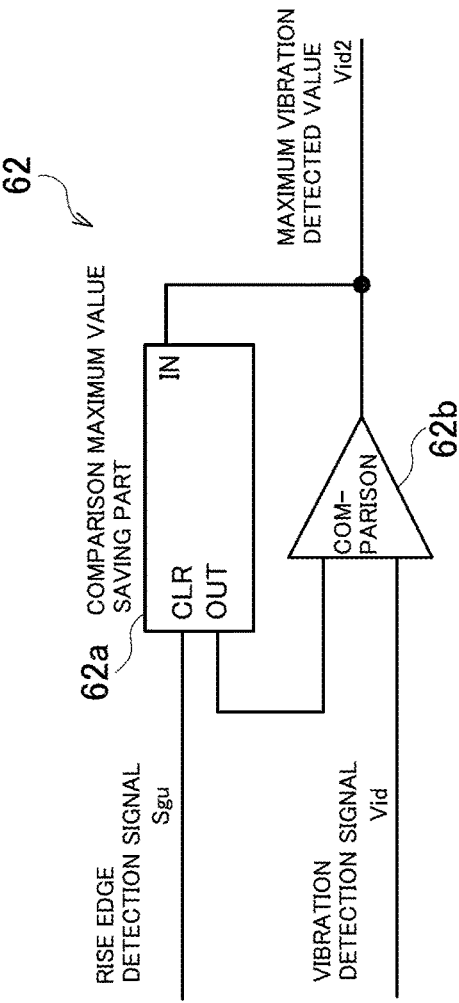
FIG. 8 is a view explaining a configuration and behavior of a maximum vibration detected value output part of the vibration damping system.
Figure 8:
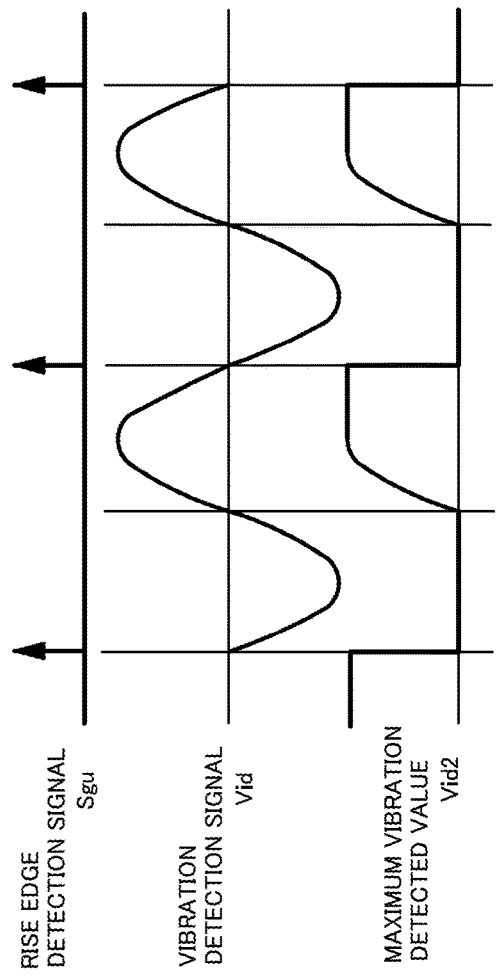

FIG. 8 is a view to show a configuration of the maximum vibration detected value output part 62 in detail and to explain its function.

The maximum vibration detected value output part 62 comprises a comparison maximum value saving part 62a and a comparison circuit 62b. The maximum vibration detected value output part 62 has the similar function as that of the minimum vibration detection signal output part 52 (refer to FIG. 7) except that the rise edge detection signal (Sgu) is input to the reset part (CLR) of the comparison maximum value saving part 62a instead of the fall edge detection signal (Sgd) and the comparison circuit 62b compares a signal obtained by the output part (OUT) of the comparison maximum value saving part 62a with the vibration detection signal (Vid) and outputs the bigger one as the maximum vibration detected value (Vid2).

The maximum vibration detected value output part 62 behaves as follows. First, since the value output by the maximum vibration detected value output part 62 is reset at the timing when the rise edge detection signal (Sgu) is input and the vibration detection signal (Vid) is zero at this time, the maximum vibration detected value (Vid1) also becomes zero. Since the vibration detection signal (Vid) becomes a value smaller than zero during half a cycle, the maximum vibration detected value (Vid2) is not updated and kept in a state of zero. The maximum vibration detected value (Vid2) is kept to be updated by the vibration detection signal (Vid) while the vibration detection signal (Vid) becomes a positive value and keeps increasing. Then, in case that the vibration detection signal (Vid) takes the peak value and then is shifted to decrease, the maximum vibration detected value (Vid2) remains to keep the peak value of the vibration detection signal (Vid) in the positive side. Furthermore, when the rise edge detection signal (Sgu) is input, the maximum vibration detected value (Vid2) is reset and the same behavior of that described in the above is repeated.

The explanation will be returned to FIG. 5 again, the maximum vibration detected value saving part 63, to which the rise edge detection signal (Sgu) obtained by the voltage command change judging part 51 and the maximum vibration detected value (Vid2) obtained by the maximum vibration detected value output part 62 are input, outputs the maximum vibration detected value (Vid2) in the single cycle wherein the vibration is detected as this time maximum vibration detected value (Vid21). More specifically, on the contrary to the minimum vibration detected value saving part 53, the maximum vibration detected value saving part 63 continuously outputs the peak value of the vibration detection signal (Vid) in the positive side in the previous single cycle as this time maximum vibration detected value (Vid21) during a single cycle.

In addition, the previous time maximum vibration detected value saving part 64, into which the rise edge detection signal (Sgu) obtained by the voltage command change judging part 51 and this time maximum vibration detected value (Vid21) obtained by the maximum vibration detected value saving part 63 are input, outputs the maximum vibration detected value (Vid2) in a cycle one more before the single cycle wherein the vibration is detected as the previous time maximum vibration detected value (Vid20). More specifically, on the contrary to the previous time minimum vibration detected value saving part 54, the previous time maximum vibration detected value saving part 64 continuously outputs the peak value of the vibration detection signal (Vid) in the positive side in a cycle that is one more before the immediately preceding single cycle as the previous time maximum vibration detected value (Vid20) during a single cycle.

Furthermore, the subtracter 65 produces a difference between this time maximum vibration detected value (Vid21) obtained by the maximum vibration detected value saving part 63 and the previous time maximum vibration detected value (Vid20) obtained by the previous time maximum vibration detected value saving part 64, and outputs the difference as the maximum vibration difference (ΔVid2).

The absolute value circuit 66 takes an absolute value of the maximum vibration difference (ΔVid2) and outputs the absolute value as the absolute value of the maximum vibration difference |ΔVid2|.

The vibration stable judging part 57 judges whether the vibration detection signal (Vid) is in the stable state or not based on the absolute value of the minimum vibration difference |ΔVid1| and the absolute value of the maximum vibration difference |ΔVid2| input by the above-mentioned two absolute value circuits 56 and 66 and the vibration stable reference value (Vis) obtained by the memory part 42 (refer to FIG. 2). If it is judged that the vibration detection signal (Vid) is in the stable state, the vibration stable detection signal (Sgs) is output as the stable judgment signal.

Figure 9:
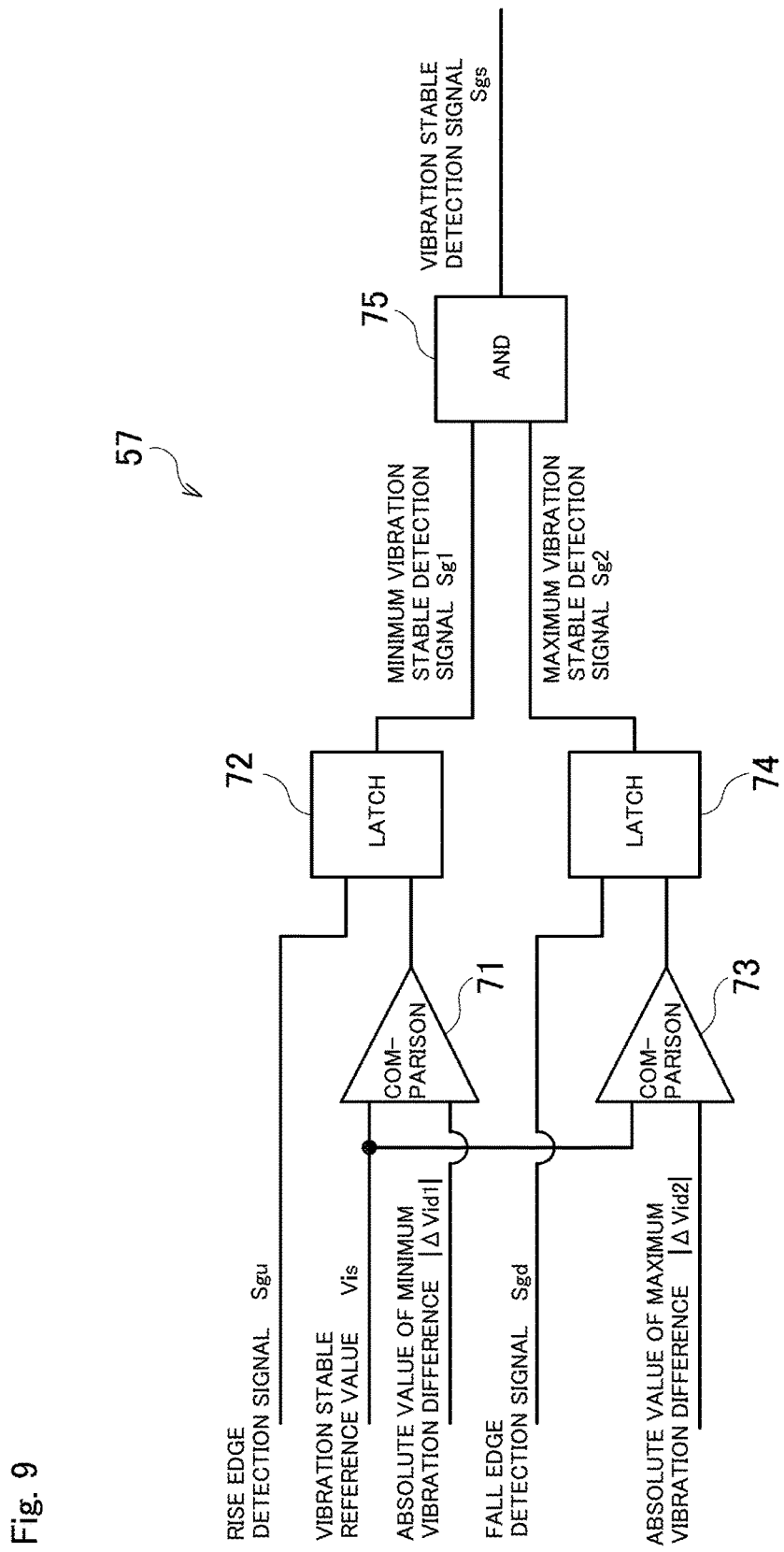
FIG. 9 is a block diagram showing a configuration of a vibration stable judging part of the vibration damping system.

FIG. 9 is a block diagram to explain a configuration of the vibration stable judging part 57 furthermore in detail. The vibration stable judging part 57 comprises two comparison circuits 71 and 73, two latch circuits 72 and 74 and an AND circuit 75.

The comparison circuit 71 compares the absolute value of the minimum vibration difference |ΔVid1| with the vibration stable reference value (Vis). In case that the absolute value of the minimum vibration difference |ΔVid1| is smaller than the vibration stable reference value (Vis), a signal is output to the latch circuit 72. In the latch circuit 72, when the rise edge detection signal (Sgu) is input in a state that an input is obtained from the comparison circuit 71, the signal from the comparison circuit 71 is latched and output as the minimum vibration stable detection signal (Sg1).

At the same time, the comparison circuit 73 compares the absolute value of the maximum vibration difference |ΔVid2| with the vibration stable reference value (Vis). In case that the absolute value of the maximum vibration difference |ΔVid2| is smaller than the vibration stable reference value (Vis), a signal is output to the latch circuit 74. In the latch circuit 74, when the fall edge detection signal (Sgd) is input in a state that an input is obtained from the comparison circuit 73, the signal from the comparison circuit 73 is latched and output as the maximum vibration stable detection signal (Sg2).

The latch circuits 72 and 74 are connected to the AND circuit 75, and the AND circuit 75 outputs the vibration stable detection signal (Sgs) when the minimum vibration stable detection signal (Sg1) from the latch circuit 72 and the maximum vibration stable detection signal (Sg2) from the latch circuit 74 are input to the AND circuit 75.

To output the vibration stable detection signal (Sgs) shows that both the change of the peak value of the vibration detection signal (Vid) in the positive side and the peak value of the vibration detection signal (Vid) in the negative side sufficiently decrease and the vibration detection signal (Vid) is in the stable state.

Figure 10:
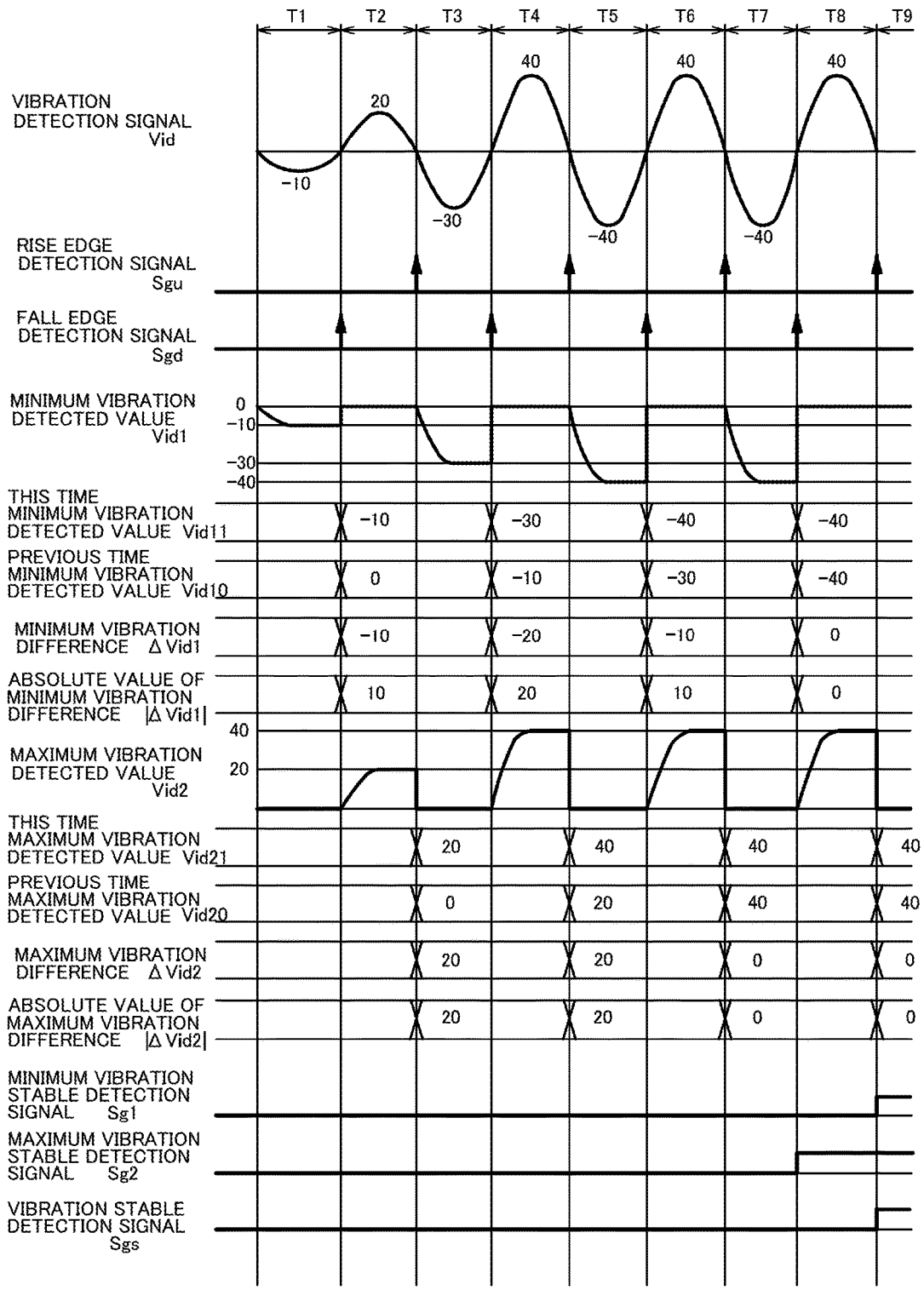
FIG. 10 is a view explaining behavior of the vibration stable judging part of the vibration damping system.

FIG. 10 is a view to schematically show a change of each signal until the vibration stable detection signal (Sgs) is obtained by the vibration stable judging part 57 shown in FIG. 9. A flow until the vibration stable detection signal (Sgs) is obtained will be explained again by the use of FIG. 10 with reference to FIG. 9.

The vibration detection signal (Vid) gradually increases its amplitude while repeating positive/negative inversion for each half cycle (T1, T2, T3 . . . ), and then reaches in the stable state wherein each amplitude becomes almost the same. Tentatively the peak value in the negative side in the half cycle (T1) is expressed by a dimensionless amount of −10, the peak value in the positive side in the next half cycle (T2) is expressed by 20, and the peak value in the negative side in the next half cycle (T3) is expressed by −30. Furthermore, in the following half cycles (T4, T5, T6 . . . ), the peak value in the positive side and the peak value in the negative side become a constant value such that the peak value in the positive side is 40 and the peak value in the negative side is −40.

As mentioned above, since a phase of the driving voltage command (Vc) is shifted from the vibration detection signal (Vid) about 90 degree, the rise edge detection signal (Sgu) is output at the beginning of each half cycle (T3, T5, T7 . . . ) and the fall edge detection signal (Sgd) is output at the beginning of each half cycle (T2, T4, T6 . . . ).

Then, if focusing on the minimum vibration detected value (Vid1), the minimum value of the vibration detection signal (Vid) is kept while the minimum vibration detected value (Vid1) is reset every time the fall edge detection signal (Sgd) is output. Furthermore, when the fall edge detection signal (Sgd) is output, the minimum vibration detected value (Vid1) immediately before the fall edge detection signal (Sgd) is output is kept during a single cycle as this time minimum vibration detected value (Vid11). More concretely, this time minimum vibration detected value (Vid11) changes as −10, −30, −40, −40 in each of the half cycles (T2~T3), (T4~T5), (T6~T7), (T8), and every previous time minimum vibration detected value (Vid10) is shifted by one cycle respectively and changes as 0, −10, −30, −40. Then, the minimum vibration difference |ΔVid1 changes as −10, −20, −10, 0 and the absolute value of the minimum vibration difference |ΔVid1| changes as 10, 20, 10, 0.

In case that the normal vibration reference value (Vis) is set to be a dimensionless amount of 1, the absolute value of the minimum vibration difference |ΔVid1| becomes smaller than the normal vibration reference value (Vis) (=1) after the half cycle (T8), and the minimum vibration stable detection signal (Sg1) is output after the half cycle (T9) in accordance with the rise edge detection signal (Sgu) that is output later.

Similarly, if focusing on the maximum vibration detected value (Vid2), the maximum value of the vibration detection signal (Vid) is kept while the maximum vibration detected value (Vid1) is reset every time the rise edge detection signal (Sgu) is output. Furthermore, when the rise edge detection signal (Sgu) is output, the maximum vibration detected value (Vid2) immediately before the rise edge detection signal (Sgu) is output is kept during a single cycle as this time maximum vibration detected value (Vid21). More concretely, this time maximum vibration detected value (Vid21) changes as 20, 40, 40, 40 in the half cycle (T3~T4), (T5~T6), (T7~T8), (T9~), and every previous time maximum vibration detected value (Vid20) is shifted by one cycle respectively and changes as 0, 20, 40, 40. Then, the maximum vibration difference (ΔVid2) and the absolute value of the minimum vibration difference |ΔVid2| change as 20, 20, 0, 0.

The absolute value of the maximum vibration difference |ΔVid2| becomes smaller than the normal vibration reference value (Vis) (=1) after the half cycle (T7), and the maximum vibration stable detection signal (Sg2) is output after the half cycle (T8) in accordance with the fall edge detection signal (Sgd) that is output later.

Furthermore, since both the minimum vibration stable detection signal (Sg1) and the maximum vibration stable detection signal (Sg2) are in a state of being output after the half cycle (T9), the vibration stable detection signal (Sgs) is output.

There is a possibility of a value that is before detection of the vibration is latched during a period from the time when the output of the vibration detection signal (Vid) is initiated to the time when the first fall edge detection signal (Sgd) or the first rise edge detection signal (Sgu) is obtained, and there is a possibility of immediately outputting the vibration stable detection signal (Sgs) in the latch circuit 72, 74 depending on a content of the value latched by the latch circuit 72, 74. In order to avoid this possibility, it is preferable that both the content of the latch circuit 72, 74 is cleared at the time of initiation or termination of execution of the failure diagnosis mode and nothing is input to the latch circuit 72, 74 from the comparison circuit 71, 73. It is a matter of course that a mask may be provided so as not to output the vibration stable detection signal (Sgs) from the AND circuit 75 until the second fall edge detection signal (Sgd) and the second fall edge detection signal (SGu) are obtained.

With this arrangement, since the vibration stable judging part 57 issues the vibration stable detection signal (Sgs) immediately after the vibration detection signal (Vid) is judged to be stabilized, it is possible to notify the timing when the diagnosis can be conducted in a short period of time without requiring unnecessary time.

Returning to FIG. 5, this time minimum vibration detected value (Vid11) obtained by the minimum vibration detected value saving part 53, this time maximum vibration detected value (Vid21) obtained by the maximum vibration detected value saving part 63 and the vibration stable detection signal (Sgs) obtained by the vibration stable judging part 57 are input to the vibration failure detecting part 58, and furthermore the normal vibration reference value (Vit) stored in the memory part 42 is input to the vibration failure detecting part 58. In addition, the vibration failure detecting part 58 compares each of this time minimum vibration detected value (Vid11) and this time maximum vibration detected value (Vid21) with the normal vibration reference value (Vit) respectively at the time when the vibration stable detection signal (Sgs) is input from the vibration stable judging part 57. In case that at least either one of the absolute value of this time minimum vibration detected value (Vid11) and the absolute value of this time maximum vibration detected value (Vid21) is smaller than the normal vibration reference value (Vit), the vibration failure detecting part 58 outputs the vibration failure detection signal (Sbv).

More specifically, since the vibration failure detecting part 58 obtains the vibration stable detection signal (Sgs) to notify the state wherein the vibration is stabilized from the vibration stable judging part 57 after initiation of the output of the driving voltage command (Vc) to the actuator 13 (refer to FIG. 2) and evaluates the vibration detection signal (Vid) immediately after obtaining the vibration stable detection signal (Sgs), it is possible to conduct diagnosis in a state that the vibration detection signal (Vid) becomes sufficiently big so that it is possible both to save energy and to shorten the time required for ready for diagnosis In case that the vibration failure detection signal (Sbv) is output, it can be judged that there is failure in behavior of the actuator 13 or in a portion related to detection of the vibration. In addition, the failure in behavior of the actuator 13 can be a case that there is failure in a portion related to production of the driving voltage (Vp) or in wiring, a case that there is failure in the actuator 13 itself mechanically or electrically, and a case that there is failure in either of components constituting the vibration damping system 1. As a result of this, that the vibration failure detection signal (Sbv) is output leads to the diagnosis that there is failure in either of the components constituting the vibration damping system 1 or there is failure in a portion related to detection of vibration so that no vibration failure detection signal (Sbv) is output leads to the diagnosis of no failure in the vibration damping system 1.

Figure 11:
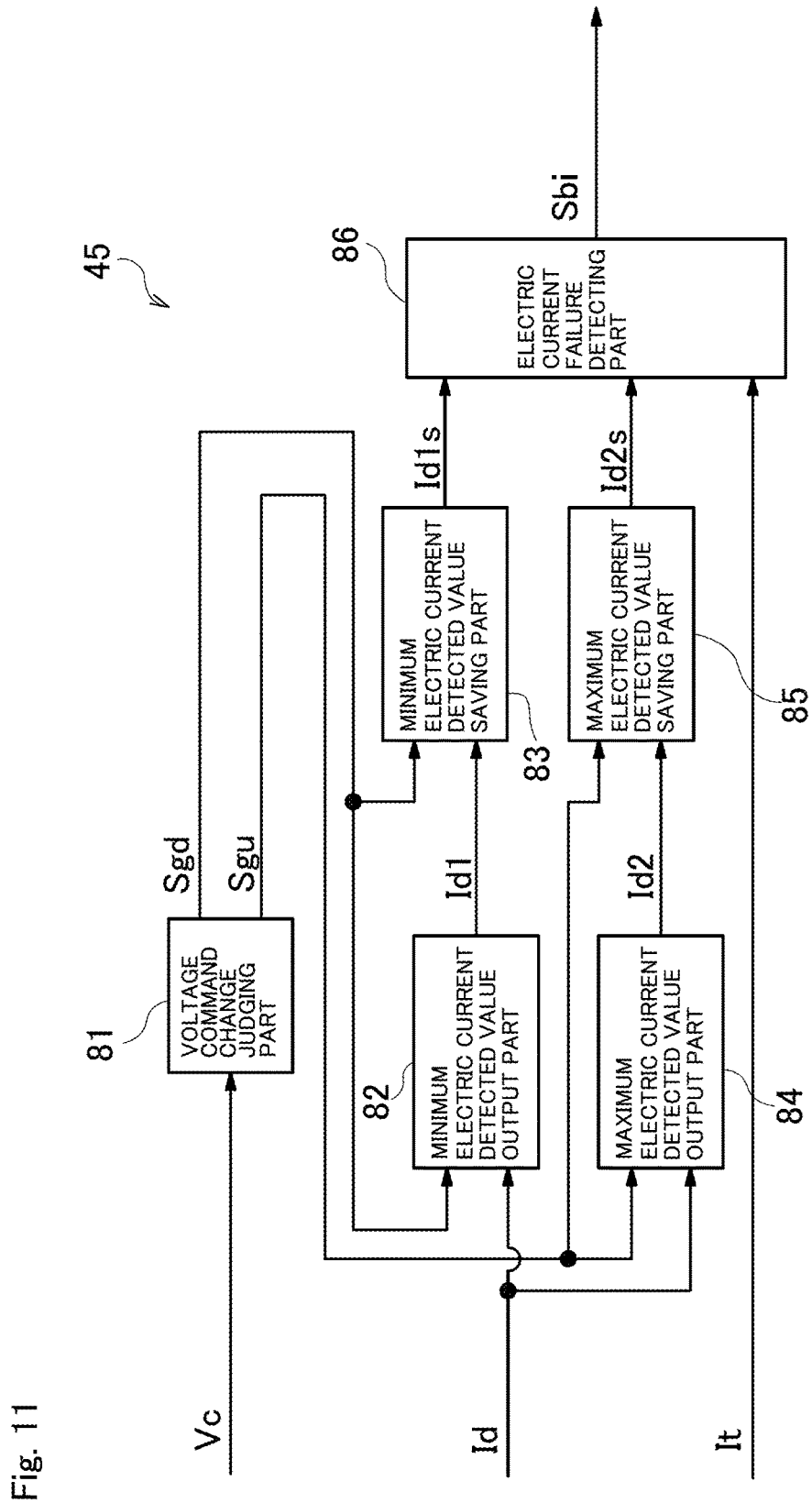
FIG. 11 is a block diagram showing a configuration of an electric current failure diagnosis part of the vibration damping system.

FIG. 11 is a block diagram showing a detailed configuration of the electric current failure diagnosis part 45 (refer to FIG. 2). As shown in FIG. 11, the electric current failure diagnosis part 45 comprises a voltage command change judging part 81, a minimum electric current detected value output part 82, a minimum electric current detected value saving part 83, a maximum electric current detected value output part 84, a maximum electric current detected value saving part 85 and an electric current failure detecting part 86.

The voltage command change judging part 81 has the same function as that of the above-mentioned electric current command change judging part 51 (refer to FIG. 6), and outputs the rise edge detection signal (Sgu) and the fall edge detection signal (Sgd) in accordance with the change of the driving voltage command (Vc).

The minimum electric current detected value output part 82 comprises the same configuration as that of the above-mentioned minimum vibration detected value output part 52 (refer to FIG. 7), wherein the electric current detection signal (Id) is the input signal instead of the vibration detection signal (Vid). When the fall edge detection signal (Sgd) is input, the value output by the minimum electric current detected value output part 82 is reset and outputs the minimum value of the electric current detection signal (Id) obtained during a period until the next fall edge detection signal (Sgd) is input as the minimum electric current detected value (Id1).

Furthermore, the minimum electric current detected value saving part 83 comprises the same configuration as that of the above-mentioned minimum vibration detected value saving part 53 (refer to FIG. 5). When the fall edge detection signal (Sgd) is input, the minimum electric current detected value saving part 83 latches the minimum electric current detected value (Id1) that is input by the minimum electric current detected value output part 82 immediately before the fall edge detection signal (Sgd) is input and outputs the latched minimum electric current detected value (Id1) as a minimum electric current saved value (Id1s).

In addition, the maximum electric current detected value output part 84 comprises the same configuration as that of the above-mentioned maximum vibration detected value output part 62 (refer to FIG. 8). When the rise edge detection signal (Sgu) is input, the value output by the maximum electric current detected value output part 84 is reset and outputs the maximum value of the electric current detection signal (Id) obtained during a period until the next rise edge detection signal (Sgu) is input as the maximum electric current detected value Id2).

Furthermore, the maximum electric current detected value saving part 85 comprises the same configuration as that of the above-mentioned maximum vibration detected value saving part 63 (refer to FIG. 5). When the rise edge detection signal (Sgu) is input, the maximum electric current detected value saving part 85 latches the maximum electric current detected value (Id2) that is input immediately before the rise edge detection signal (Sgu) is input and output that latched maximum electric current detected value (Id2) as the maximum electric current saved value (Id2s).

The minimum electric current saved value (Id1s) obtained by the minimum electric current detected value saving part 83 and the maximum electric current saved value (Id2s) obtained by the maximum electric current detected value saving part 85 are input to the electric current failure detecting part 86, and furthermore the normal electric current reference value (It) stored in the memory part 42 is input to the electric current failure detecting part 86. In addition, the electric current failure detecting part 86 compares each of the minimum electric current saved value (Id1s) and the maximum electric current saved value (Vd2s) with the normal electric current reference value (It) respectively. In case that at least either one of the minimum electric current saved value (Id1s) and the maximum electric current saved value (Id2s) is smaller than the normal electric current reference value (It), the electric current failure detecting part 86 outputs the electric current failure detection signal (Sbi).

In case that the electric current failure detection signal (Sbi) is output, it can be judged that there is failure in the production of the driving voltage (Vp) supplied to the actuator 13 or a portion related to detection of the electric current. These failures include the wiring defect at the related portion. As mentioned above, it can be diagnosed roughly whether the vibration damping system 1 is in a normal state or not just by obtaining the vibration failure detection signal (Sbv). If the output of the electric current failure detection signal (Sbi) is obtained in addition to the vibration failure detection signal (Sbv), it is possible to easily specify a failure portion more concretely when it is diagnosed there is failure.

In order to diagnose the failure by the use of the abovementioned vibration failure diagnosis part 44 and the abovementioned electric current failure diagnosis part 45, the operating mode setting part 41 sets the failure diagnosis mode and the driving voltage command for diagnosis (Vct) produced by the voltage command producing part for diagnosis 43B is output as the driving voltage command (Vc). It can be conceived that the failure diagnosis is conducted as one of the examinations in a stage wherein the vibration damping system 1 is incorporated into the vehicle, or in case of conducting a periodical inspection such as an automobile inspection. It is a matter of course that this failure diagnosis can be conducted at the appropriate timing in case that a function of the vibration damping system 1 is suspected such that an appropriate vibration damping effect is not obtained. In any cases, it is possible to conduct the failure diagnosis easily without dismounting components such as the acceleration sensor 14 or the actuator 13.

As mentioned above, the vibration damping system 1 in accordance with this embodiment comprises the actuator 13 as the vibration applying device mounted on the frame 11, the vibration detecting device (Mv) that detects the vibration appearing at the reference point (Pref) through the frame 11 and that outputs the vibration detection signal (Vid), and the control device 31 that controls the actuator 13, and the control device 31 comprises the voltage command producing part 43 that produces the driving voltage command (Vc) to drive the actuator 13 and the vibration failure diagnosis part 44 that diagnoses whether there is failure or not based on the vibration detection signal (Vid) output by the vibration detecting device (Mv). In executing the normal mode in which the control to damp the vibration is conducted, the voltage command producing part 43 produces the driving voltage command (Vc) based on the vibration detection signal (Vid) and makes the actuator 13 generate the vibration applying force according to the driving voltage command (Vc). In executing the failure diagnosis mode in which the control to diagnose failure is conducted, the voltage command producing part 43 produces the driving voltage command (Vc) corresponding to the diagnosis frequency (Fc) that is previously set at the frequency identical to the resonance frequency of the frame 11 or the predetermined frequency close to the resonance frequency and makes the actuator 13 generate the vibration applying force according to the driving voltage command (Vc), and the vibration failure diagnosis part 44 diagnoses whether there is failure or not based on the vibration detection signal (Vid).

In accordance with this arrangement, in the normal mode, the voltage command producing part 43 produces the driving voltage command (Vc) based on the vibration detection signal (Vid) obtained by the vibration detecting device (Mv), and makes the actuator 13 generate the vibration applying force in accordance with this driving voltage command (Vc) so that it is possible to appropriately damp the vibration. On the other hand, in the failure diagnosis mode, the voltage command producing part 43 produces the driving voltage command (Vc) corresponding to the diagnosis frequency (Fc) that is set at the frequency identical to the resonance frequency of the frame 11 or the predetermined frequency near the resonance frequency and the actuator 13 is operated at the resonance frequency of the frame 11 or at the frequency near the resonance frequency so that it is possible to generate the big vibration at the reference point (Pref) by making use of the resonance phenomenon with less energy. As a result of this, since the big vibration detection signal (Vid) can be obtained by the vibration detecting device (Mv), it is possible to conduct the diagnosis whether there is failure in the vibration failure diagnosis part 44 or not more accurately based on the vibration detection signal (Vid) without dismounting the components such as the acceleration sensor 14 or the actuator 13 constituting the vibration damping system 1. Furthermore, since it is also possible to conduct the diagnosis whether there is failure or not quickly by vibrating the frame 11 largely, the time required for failure diagnosis can be shortened.

In addition, it is so configured that the vibration failure diagnosis part 44 comprises the vibration stable judging part 57 that judges the vibration detection signal (Vid) is in a stable state and that outputs the vibration stable detection signal (Sgs) as the stable judgment signal, and the vibration failure detecting part 58 that compares the vibration detection signal (Vid) with the previously determined normal vibration reference value (Vit) and that outputs the vibration failure detection signal (Sbv) in case that the vibration detection signal (Vid) is smaller than the normal vibration reference value (Vit), and the vibration failure detecting part 58 compares the vibration detection signal (Vid) with the normal vibration reference value (Vit) in case that the output of the driving voltage command (Vc) to the actuator 13 is initiated and the vibration stable detection signal (Sgs) is input by the vibration stable judging part 57. With this arrangement, if it is so judged that the vibration is stabilized by the vibration stable judging part 57 and the vibration failure detecting part 58 compares the vibration detection signal (Vid) with the normal vibration reference value (Vit) after the vibration stable detection signal (Sgs) is output and the diagnosis whether there is failure or not is conducted depending on whether the vibration failure detection signal (Sbv) is output or not, it is possible to obtain the big vibration detection signal (Vid) with less energy and to conduct the diagnosis whether there is failure or not more accurately. In addition, since the diagnosis whether there is failure or not can be conducted quickly after the vibration is stabilized, it is possible to conduct the diagnosis accurately and in a short period of time without requiring unnecessary time course.

Furthermore, since in case that a difference between this time minimum vibration detected value (Vid11), this time maximum vibration detected value (Vid21) as the peak value in one cycle of the vibration detection signal (Vid) and the previous time minimum vibration detected value (Vid10), the previous time maximum vibration detected value (Vid20) as the peak value in a cycle immediately previous to the cycle becomes smaller than the previously determined vibration stable reference value (Vis), the vibration stable judging part 57 judges that the vibration detection signal (Vid) is in the stable state and outputs the vibration stable detection signal (Sgs), it becomes possible to easily and quickly judge that the vibration detection signal (Vid) becomes in the stable state, more specifically, the vibration is stabilized.

In addition, the electric current detecting device (Mi) that detects the driving electric current supplied to the actuator 13 and that outputs the electric current detection signal (Id) is provided, and the control device 31 comprises the electric current failure diagnosis part 45 that diagnoses whether there is failure or not based on the electric current detection signal (Id) output by the electric current detecting device (Mi). With this arrangement, since it is possible to conduct two types of failure diagnosis together with the vibration failure diagnosis part 44 by conducting the diagnosis whether the driving electric current to operate the actuator 13 is appropriately supplied or not, it is possible to make it easy to specify a concrete failure portion in case that it is diagnosed there is failure.

In addition, if the vibration damping system 1 comprises the frame 11 of which at least one part of a body of the vehicle is composed, it is possible to constitute the vehicle that can conduct failure diagnosis of the vibration damping system 1 both easily and in a short period of time in addition to damping the vibration appropriately.

A concrete configuration of each component is not limited to the above-mentioned embodiment.

For example, the diagnosis frequency (Fc) is set to be identical to the resonance frequency of the frame 11 or a frequency near the resonance frequency in the above-mentioned embodiment, however, instead of this, the diagnosis frequency (Fc) may be set to be identical to the resonance frequency of the actuator 13 or a frequency near this resonance frequency. In this case also, since big vibration is generated to the actuator 13 with less energy and a big vibration applying force can be given to the frame 11, it is possible to obtain big vibration at the reference point (Pref) so that the same effect as that of the above-mentioned embodiment can be obtained.

In addition, the actuator 13 is controlled so as to give cancelling vibration that has an opposite phase as that of the vibration at the reference point (Pref) in order to cancel vibration at the reference point (Pref) in the above-mentioned embodiment, however, this invention can be effectively utilized for a control method that is different from that of this invention. More concretely, this invention can be utilized also for the control method wherein the driving voltage command is produced on the basis of the reference frequency that is set based on the driving signal pulse obtained from the vibration source 12 such as the engine, the driving voltage command (Vc) to drive the actuator 13 is produced by an appropriate control algorithm, or the driving voltage command (Vc) is produced so as to generate the vibration applying force in accordance with a relative displacement and a relative speed of the actuator 13 from the frame 11 in order to use the actuator 13 as an active type vibration absorbing device.

Furthermore, the minimum vibration detected value (Vid1) is detected within one cycle between two fall edge detection signals (Sgd, Sgd) in the above-mentioned embodiment, however, the minimum vibration detected value (Vid1) may be detected only during a half cycle from the time when the rise edge detection signal (Sgu) is obtained to the time when the fall edge detection signal (Sgd). With this arrangement, in case that wiring of positive/negative is falsely connected, the minimum vibration detected value (Vid1) cannot be obtained so that it is possible to easily find faulty wiring. Similarly, the maximum vibration detected value (Vid2) may be detected only during the time when the fall edge detection signal (Sgd) is obtained to the time when the rise edge detection signal (Sgu) is obtained.

In addition, in the above-mentioned embodiment, the vibration failure diagnosis part 44 produces the absolute value of the difference between this time minimum vibration detected value (Vid11) and this time maximum vibration detected value (Vid21) as being the peak value in the negative side and the peak value in the positive side in one cycle of the vibration detection signal (Vid) and the previous time minimum vibration detected value (Vid10) and the previous time maximum vibration detected value (Vid20) as being the peak value in the negative side and the peak value in the positive side in a cycle immediately previous to the cycle, it is judged that the vibration is stabilized in case that the absolute value of the difference is smaller than the vibration stable reference value (Vis), and the vibration stable detection signal (Sgs) is output from the vibration stable judging part 57. However, a state that the vibration is stabilized may be judged based on a change amount of the peak value during separated plurality of cycles such as in two cycles or in three cycles instead of judging the state that the vibration is stabilized based on a change amount of the peak value in every one cycle.

Furthermore, in case that the time period required for the vibration to be stabilized or periodicity is known from experience, a stable judgment signal may be output instead of the vibration stable detection signal (Sgs) when the time period or the periodicity passes from the time when the diagnosis is initiated.

On the contrary, in case that the supporting configuration of the frame 11 comprising a component made of a material such as rubber that can be assumed to be affected by aged deterioration and the time period required for the vibration to be stabilized or the periodicity changes largely due to the aged deterioration of the material, a function to count and record the time from initiation of the output of the driving voltage command (Vc) to the vibration stable detection signal (Sgs) may be provided. With this arrangement, it is possible to grasp the change of the decayed material by checking the record and to utilize the record for prediction of failure or for estimation of replacement time of the component.

In addition, in the above-mentioned embodiment, the reference point (Pref) at which the acceleration sensor 14 is mounted is set at one place on the frame 11, however, the reference point (Pref) may be set at any place of the vehicle as being an object to damp the vibration. For example, the reference point (Pref) may be set on, for example, a seat, a dashboard or a handle of a vehicle. In this case also, there is no change that the vibration applying force by the actuator 13 is transmitted to the reference point (Pref) through the frame 11 and it is possible to constitute the vibration damping system 1 similar to the above-mentioned embodiment.

Furthermore, the vibration damping system 1 can be preferably used not only for the vehicle but also various devices comprising a vibration source similar to the above-mentioned embodiment. In this case also, the actuator 13 may be provided for the frame 11 constituting at least a part of the device as being an object to damp the vibration and the reference point (Pref) may be set appropriately at a position to which the vibration is transmitted through the frame 11.

In addition, instead of the above-mentioned actuator 13, other vibration applying device having a different configuration may be used as long as the vibration applying force is provided by supplying the driving voltage (Vp).

Other configuration may be variously modified without departing from the spirit of the invention.

EXPLANATION OF CODES

1 . . . vibration damping system
11 . . . frame
13 . . . actuator (vibration applying device)
14 . . . acceleration sensor
31 . . . control device
43 . . . voltage command producing part
44 . . . vibration failure diagnosis part
45 . . . electric current failure diagnosis part
57 . . . vibration stable judging part
58 . . . vibration failure detecting part
Fc . . . diagnosis frequency
Id . . . electric current detection signal
Mi . . . electric current detecting device
Mv . . . vibration detecting device
Pref . . . reference point
Sbv . . . vibration failure detection signal
Sgs . . . vibration stable detection signal (stable judgment signal)
Vc . . . driving voltage command
Vid . . . vibration detection signal
Vis . . . vibration stable reference value
Vit . . . normal vibration reference value
Vid10 . . . previous time minimum vibration detected value (peak value in the negative side)
Vid11 . . . this time minimum vibration detected value (peak value in the negative side)
Vid20 . . . previous time maximum vibration detected value (peak value in the positive side)
Vid21 . . . this time maximum vibration detected value (peak value in the positive side)

The invention claimed is:

1. A vibration damping system comprising a vibration applying device mounted on a frame, a vibration detecting device that detects vibration appearing at a reference point through the frame and that outputs a vibration detection signal, and a control device that controls the vibration applying device, wherein
the control device comprises a voltage command producing part that produces a driving voltage command to drive the vibration applying device and a vibration failure diagnosis part that diagnoses whether there is failure or not based on the vibration detection signal output by the vibration detecting device,
in executing a normal mode in which control to damp the vibration is conducted, the voltage command producing part produces the driving voltage command based on the vibration detection signal and makes the vibration applying device generate a vibration applying force according to the driving voltage command, and
in executing a failure diagnosis mode in which control to diagnose failure is conducted, the voltage command producing part produces the driving voltage command corresponding to a diagnosis frequency that is previously set at a frequency identical to either one of a resonance frequency of the frame and a resonance frequency of the vibration applying device or a predetermined frequency close to the resonance frequency and makes the vibration applying device generate the vibration applying force according to the driving voltage command, and the vibration failure diagnosis part diagnoses whether there is failure or not based on the vibration detection signal
the vibration failure diagnosis part comprises a vibration stable judging part that judges the vibration detection signal is in a stable state and that outputs a stable judgment signal, and
a vibration failure detecting part that compares the vibration detection signal with a previously determined normal vibration reference value and that outputs a vibration failure detection signal in the case that the vibration detection signal is smaller than the normal vibration reference value, and
the vibration failure detecting part compares the vibration detection signal with the normal vibration reference value in the case that output of the driving voltage command to the vibration applying device is initiated and the stable judgment signal is input by the vibration stable judging part.

2. The vibration damping system described in claim 1, wherein
in the case that a difference between a peak value in one cycle of the vibration detection signal and a peak value in a cycle immediately previous to the cycle becomes smaller than a previously determined vibration stable reference value, the vibration stable judging part judges that the vibration detection signal is in the stable state and outputs the stable judgment signal.

3. The vibration damping system described in claim 2, wherein
an electric current detecting device that detects a driving electric current supplied to the vibration applying device and that outputs an electric current detection signal is provided, and
the control device comprises an electric current failure diagnosis part that diagnoses whether there is failure or not based on the electric current detection signal output by the electric current detecting device.

4. A vehicle comprising the vibration damping system described in claim 3, wherein
the frame constitutes at least one part of a body of the vehicle.

5. A vehicle comprising the vibration damping system described in claim 2, wherein
the frame constitutes at least one part of a body of the vehicle.

6. The vibration damping system described in claim 1, wherein an electric current detecting device that detects a driving electric current supplied to the vibration applying device and that outputs an electric current detection signal is provided, and the control device comprises an electric current failure diagnosis part that diagnoses whether there is failure or not based on the electric current detection signal output by the electric current detecting device.

7. A vehicle comprising the vibration damping system described in claim 6, wherein the frame constitutes at least one part of a body of the vehicle.

8. A vehicle comprising the vibration damping system described in claim 1, wherein the frame constitutes at least one part of a body of the vehicle.

9. A vibration damping system comprising a vibration applying device mounted on a frame, a vibration detecting device that detects vibration appearing at a reference point through the frame and that outputs a vibration detection signal, and a control device that controls the vibration applying device, wherein the control device comprises a voltage command producing part that produces a driving voltage command to drive the vibration applying device and a vibration failure diagnosis part that diagnoses whether there is failure or not based on the vibration detection signal output by the vibration detecting device, in executing a normal mode in which control to damp the vibration is conducted, the voltage command producing part produces the driving voltage command based on the vibration detection signal and makes the vibration applying device generate a vibration applying force according to the driving voltage command, and in executing a failure diagnosis mode in which control to diagnose failure is conducted, the voltage command producing part produces the driving voltage command corresponding to a diagnosis frequency that is previously set at a frequency identical to either one of a resonance frequency of the frame and a resonance frequency of the vibration applying device or a predetermined frequency close to the resonance frequency and makes the vibration applying device generate the vibration applying force according to the driving voltage command, and the vibration failure diagnosis part diagnoses whether there is failure or not based on the vibration detection signal an electric current detecting device that detects a driving electric current supplied to the vibration applying device and that outputs an electric current detection signal is provided, and the control device comprises an electric current failure diagnosis part that diagnoses whether there is failure or not based on the electric current detection signal output by the electric current detecting device.

10. A vehicle comprising the vibration damping system described in claim 9, wherein the frame constitutes at least one part of a body of the vehicle.

11. A vibration damping system comprising a vibration applying device mounted on a frame, a vibration detecting device that detects vibration appearing at a reference point through the frame and that outputs a vibration detection signal, and a control device that controls the vibration applying device, wherein the control device comprises a voltage command producing part that produces a driving voltage command to drive the vibration applying device and a vibration failure diagnosis part that diagnoses whether there is failure or not based on the vibration detection signal output by the vibration detecting device, in executing a normal mode in which control to damp the vibration is conducted, the voltage command producing part produces the driving voltage command based on the vibration detection signal and makes the vibration applying device generate a vibration applying force according to the driving voltage command, and in executing a failure diagnosis mode in which control to diagnose failure is conducted, the voltage command producing part produces the driving voltage command corresponding to a diagnosis frequency that is previously set at a frequency identical to either one of a resonance frequency of the frame and a resonance frequency of the vibration applying device or a predetermined frequency close to the resonance frequency and makes the vibration applying device generate the vibration applying force according to the driving voltage command, and the vibration failure diagnosis part diagnoses whether there is failure or not based on the vibration detection signal, the vibration damping system further comprising a vibration failure detecting part that compares the vibration detection signal with a previously determined normal vibration reference value and that outputs a vibration failure detection signal in the case that the vibration detection signal is smaller than the normal vibration reference value, the vibration failure diagnosis part comprises a vibration stable judging part that judges the vibration detection signal is in a stable state and that outputs a stable judgment signal, and the vibration failure detecting part compares the vibration detection signal with the normal vibration reference value in the case that the stable judgment signal is input by the vibration stable judging part.

* * * * *